(12) United States Patent
Jogdand et al.

(10) Patent No.: US 10,737,347 B2
(45) Date of Patent: *Aug. 11, 2020

(54) THREAD CONNECTION FOR A TORCH SYSTEM

(71) Applicant: Hypertherm, Inc., Hanover, NH (US)

(72) Inventors: Harshawardhan Jogdand, Lebanon, NH (US); E. Michael Shipulski, Etna, NH (US); David J. Cook, Bradford, VT (US); David L. Bouthillier, Hartford, VT (US); Zheng Duan, Hanover, NH (US); Jesse A. Roberts, Cornish, NH (US); Micah Roberts, Lebanon, NH (US); Stephen M. Dunbar, Lebanon, NH (US); Peter J. Twarog, Meriden, NH (US); Brian J. Currier, Newport, NH (US); Stephen M. Liebold, Grantham, NH (US); Brett A. Hansen, Mapleton, UT (US); Garrett K. Quillia, Enfield, NH (US)

(73) Assignee: Hypertherm, Inc., Hanover, NH (US)

( * ) Notice: Subject to any disclaimer, the term of this patent is extended or adjusted under 35 U.S.C. 154(b) by 270 days.

This patent is subject to a terminal disclaimer.

(21) Appl. No.: 15/904,871

(22) Filed: Feb. 26, 2018

(65) Prior Publication Data

US 2018/0178310 A1   Jun. 28, 2018

Related U.S. Application Data

(63) Continuation-in-part of application No. 15/023,258, filed as application No. PCT/US2014/056546 on Sep.
(Continued)

(51) Int. Cl.
*B23K 10/00*   (2006.01)
*B23K 9/32*   (2006.01)
(Continued)

(52) U.S. Cl.
CPC ............ *B23K 9/323* (2013.01); *B23K 10/027* (2013.01); *F16L 15/007* (2013.01); *F16L 15/06* (2013.01);
(Continued)

(58) Field of Classification Search
CPC .......... B23K 9/323; B23K 9/32; B23K 10/00; C24D 14/52; H05H 1/26; H05H 1/28; H05H 1/34
(Continued)

(56) References Cited

U.S. PATENT DOCUMENTS 906,217 A    12/1908   Gaylord
1,325,468 A    12/1919   Foster
(Continued)

FOREIGN PATENT DOCUMENTS

EP    0757408    5/1997
EP    0 933 981    4/1999
(Continued)

*Primary Examiner* — Mark H Paschall
(74) *Attorney, Agent, or Firm* — Proskauer Rose LLP

(57) ABSTRACT

A connector component configured for coupling a consumable component to a plasma arc torch is provided. The connector component comprises a body having a proximal end and a distal end disposed along and defining a longitudinal axis. The connector component includes at least two engagement regions disposed radially about the longitudinal axis on a surface of the body. Each engagement region includes at least one engagement feature disposed on the surface of the body. The connector component also includes at least two free regions disposed radially about the longitudinal axis on the surface of the body. Each free region is radially located between a pair of the engagement regions and characterized by an absence of the engagement feature.

29 Claims, 22 Drawing Sheets

Related U.S. Application Data 19, 2014, which is a continuation-in-part of application No. 14/031,420, filed on Sep. 19, 2013, now Pat. No. 9,642,236.

(60) Provisional application No. 61/991,114, filed on May 9, 2014, provisional application No. 62/464,089, filed on Feb. 27, 2017.

(51) Int. Cl.

| | | |
|---|---|---|
| *B23K 10/02* | (2006.01) | |
| *F16L 15/00* | (2006.01) | |
| *H05H 1/34* | (2006.01) | |
| *F16L 15/06* | (2006.01) | |
| *F16L 37/252* | (2006.01) | |
| *F23D 14/52* | (2006.01) | |

(52) U.S. Cl.
CPC ............ *H05H 1/34* (2013.01); *H05H 1/3405* (2013.01); *F16L 37/252* (2013.01); *F23D 14/52* (2013.01); *H05H 2001/3436* (2013.01); *H05H 2001/3442* (2013.01); *H05H 2001/3473* (2013.01)

(58) Field of Classification Search
USPC ......... 219/121.52, 121.51, 121.5, 75, 121.39
See application file for complete search history.

(56) References Cited

U.S. PATENT DOCUMENTS

| | | |
|---|---|---|
| 4,628,177 A | 12/1986 | Dempsey et al. |
| 4,695,702 A | 9/1987 | Gartland |
| 5,399,831 A | 3/1995 | McGee |
| 5,874,707 A | 2/1999 | Iida et al. |
| 6,169,264 B1 | 1/2001 | Marhic |
| 6,283,511 B1 | 9/2001 | Kamp |
| 6,713,711 B2 | 3/2004 | Conway et al. |
| 6,881,921 B2 | 4/2005 | Horner-Richardson et al. |
| 6,957,972 B2 | 10/2005 | Starke et al. |
| 6,987,237 B2 | 1/2006 | Walters |
| 6,987,238 B2 | 1/2006 | Horner-Richardson et al. |
| 7,429,714 B2 | 9/2008 | DePetrillo et al. |
| 2005/0218132 A1 | 10/2005 | Wells |
| 2008/0185842 A1 | 8/2008 | Blackman et al. |
| 2009/0123226 A1 | 5/2009 | Viegener |
| 2009/0170364 A1 | 7/2009 | Scholler et al. |
| 2011/0259855 A1 | 10/2011 | Yang |
| 2012/0272508 A1* | 11/2012 | Stauss .................... F16B 7/187 29/525.11 |

FOREIGN PATENT DOCUMENTS

| | | |
|---|---|---|
| EP | 1988324 | 11/2008 |
| JP | 57-44467 | 3/1982 |
| JP | 2009534803 | 9/2009 |
| WO | 0128728 | 4/2001 |
| WO | 03041459 | 5/2003 |
| WO | 2004043637 | 5/2004 |
| WO | 2013028487 | 2/2013 |

\* cited by examiner

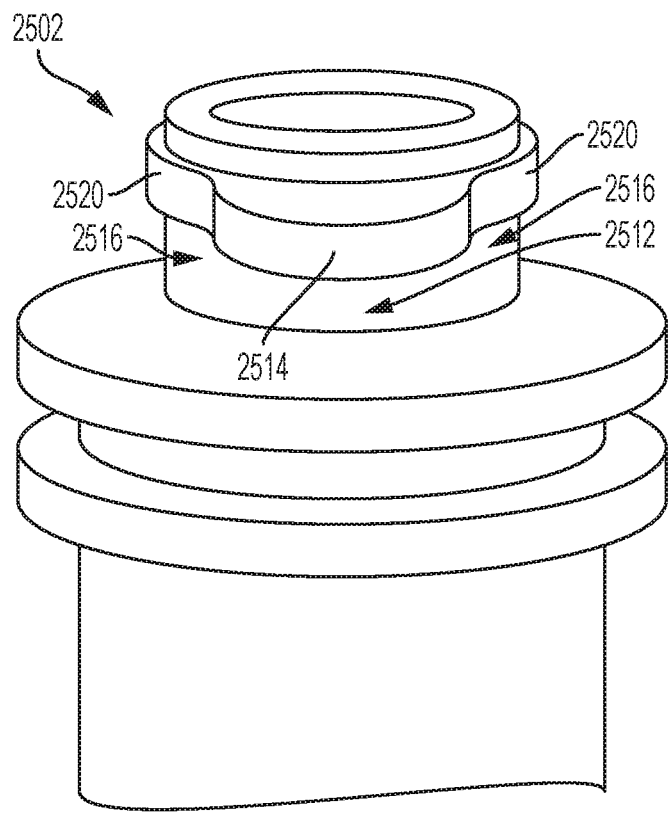
FIG. 26
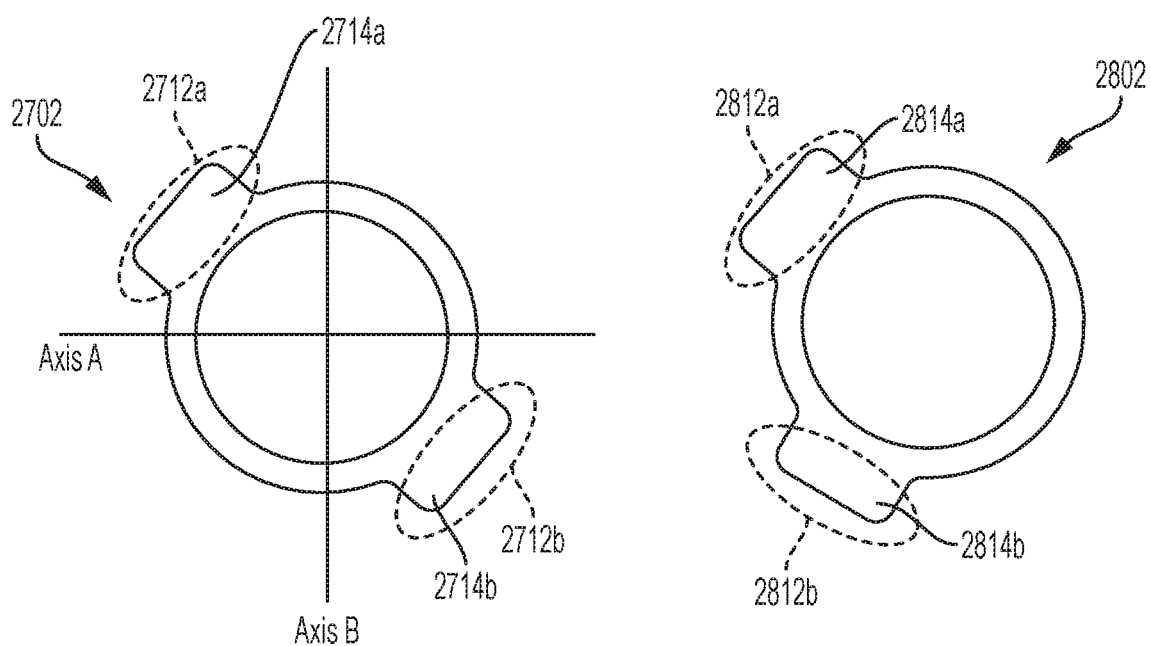
FIG. 27  FIG. 28

THREAD CONNECTION FOR A TORCH SYSTEM

CROSS REFERENCE TO RELATED APPLICATIONS

This application is a continuation-in-part of U.S. Ser. No. 15/023,258, filed Mar. 18, 2016 and titled "Thread Connection for a Torch System," which is a 371 of PCT/US2014/056546 filed Sep. 19, 2014, which is a continuation-in-part of U.S. Ser. No. 14/031,420, filed Sep. 19, 2013 and titled "Thread Connection for a Torch System," which claims benefit of and priority to U.S. Ser. No. 61/991,114, filed May 9, 2014 and titled "Cartridge Type Consumable Assembly for a Plasma Arc Cutting System." All of these are owned by the assignee of the instant application and the entirety of each of them is incorporated herein by reference in their entireties. This application also claims the benefit of and priority to U.S. Provisional Patent Application No. 62/464,089, filed Feb. 27, 2017, the entire content of which is owned by the assignee of the instant application and is incorporated herein by reference in its entirety.

FIELD OF THE INVENTION

The present invention relates generally to one or more connector components configured for connecting torch parts to a torch system.

BACKGROUND OF THE INVENTION

Material Processing heads, such as plasma torches, water jet cutting heads, and laser heads, are widely used in the heating, cutting, gouging and marking of materials. For example, a plasma arc torch generally includes electrical connections, passages for cooling, passages for arc control fluids (e.g., plasma gas), and consumables, such as an electrode and a nozzle having a central exit orifice mounted within a torch body. Optionally, a swirl ring is employed to control fluid flow patterns in the plasma chamber formed between the electrode and the nozzle. In some plasma arc torches, a retaining cap can be used to maintain the nozzle and/or swirl ring in the torch body.

One or more connector components can be used to attach the consumables to a torch system. Existing connector components with standard threading, however, can require as many as five complete rotations to engage or disengage a consumable. Changing consumable parts may be frequent, often occurring several times a day. Hence, existing connector components can slow down the consumable changing process, thereby reducing the time that can be spent on cutting and other useful torch operations.

SUMMARY OF THE INVENTION

Thus, systems and methods are needed to simplify the engagement and disengagement of a torch part in relation to a torch system, such as reducing the number and/or degree of rotation required to fully engage or disengage the torch parts. By allowing torch connections to be engaged or disengaged faster and easier, handling time of a torch can be reduced. Conversely, torch operation time can be increased.

In one aspect, a connector component is provided for assembly into a torch. The connector component comprises a body that includes a proximal end and a distal end disposed along a longitudinal axis. At least two thread regions are disposed radially about the longitudinal axis on a surface of the body near the proximal end. Each thread region includes at least two parallel threads disposed on the surface of the body. In addition, at least two smooth regions are each disposed radially about the longitudinal axis interspersed between a pair of thread regions on the surface of the body.

In some embodiments, the connector component comprises a male component configured to securely engage a female component. The male component can include a gap disposed at the distal end of the body. The gap is configured to prevent rotation of the male component in the female component unless the gap is aligned with a corresponding rim of the female component.

In some embodiments, the connector component comprises a female component configured to securely engage a male component. The female component can include a rim disposed on the distal end of the body. The rim is configured to prevent rotation of the male component in the female component unless the rim is aligned with a corresponding gap of the male component.

In some embodiments, the at least two thread regions are disposed radially about the body in a rotationally symmetrical arrangement. In some embodiments, the at least two smooth regions are disposed radially about the body in a rotationally symmetrical arrangement. In some embodiments, the at least two parallel threads are oriented substantially helical about the longitudinal axis. In some embodiments, the at least two parallel threads are oriented substantially orthogonal to the longitudinal axis. The at least two parallel threads can be evenly spaced relative to each other along the longitudinal axis.

In some embodiments, the connector component includes three thread regions.

In some embodiments, the threads of one thread region are discontinuous from the threads of an adjacent thread region. The location and orientation of the threads on one thread region can be substantially the same as those of another thread region.

In some embodiments, the connector component is configured to secure a corresponding component. At least one of the smooth regions of the connector component can be configured to align with at least one of the thread regions of the corresponding component to facilitate slidable displacement of one component into the other component. During engagement, one component can be rotatable in relation to the other component in a first direction by a number of degrees less than 360° to secure the other component. For example, the number of degrees can be less than or equal to about 60°, 90°, or 180°. The components can be disengaged when one component is rotated in relation to the other component in a second direction opposite from the first direction by about the same number of degrees.

In some embodiments, the connector component is coupled to a consumable of the plasma arc torch for attaching the consumable to another element of the plasma arc torch. The consumable can comprise one of an electrode, nozzle, retaining cap, shield or torch.

In another aspect, a consumable connector component is provided for attaching a consumable to a corresponding component of a torch. The consumable connector component comprises a cylindrical body that includes a proximal end and a distal end disposed along a longitudinal axis. Multiple longitudinally-oriented smooth regions are disposed radially about a surface of the body about the proximal end. In addition, multiple longitudinally-oriented segments are disposed radially about the body interspersed between the smooth regions. Each segment includes a plurality of threads disposed in parallel to one another along the surface of the body such that the threads of one segment are discontinuous from the threads of an adjacent segment.

In some embodiments, the location and orientation of the threads on one segment are substantially the same as those of a different segment.

In some embodiments, the discontinuous threads prevent a segment of the consumable connector component from engaging more than one segment of the corresponding component during rotation.

In another aspect, a method is provided for engaging a first component and a second component for a torch. The first and second components each has i) a plurality of thread regions each having a plurality of threads and ii) a plurality of slotted regions characterized by the absence of threads. The method includes aligning radially at least one thread region of the first component with at least one slotted region of the second component, sliding the first component into the second component longitudinally in the radially aligned position, and rotating the first component in one direction relative to the second component to engage at least one thread of the thread region of the first component with at least one thread of the thread region of the second component to secure the first and second components relative to one another.

In some embodiments, the method further comprises preventing the first component from rotating with respect to the second component during the sliding, engaging a gap of the first component with a rim of the second component, and rotating the first component relative to the second component in one direction after the engaging.

In some embodiments, rotating the first component relative to the second component comprises rotating the first component by a number of degrees less than 360°. The number of degrees can be a number that is less than or equal to about 60°, 90° or 180°.

In some embodiments, the method further comprises rotating the first component relative to the second component in an opposite direction by about the same number of degrees to disengage the two components. During disengagement, the first component can be prevented from rotating further in the opposite direction when an edge of a thread region of the first component encounters an edge of a thread region of the second component in the rotational path (i.e., when misalignment of the threads occurs).

In some embodiments, at least one of the first component or the second component is coupled to a consumable of the plasma arc torch.

In some embodiments, the method further comprises aligning radially the plurality of thread regions of the first component with the plurality of slotted region of the second component.

In some embodiments, the method further comprises aligning radially the plurality of slotted regions of the first component with the plurality of thread regions of the second component.

In yet another aspect, a connector component is configured for assembly into a material processing head. The connector component includes a generally cylindrical body including a proximal end and a distal end defining a longitudinal axis, at least two thread regions disposed at a radial location on a surface of the body near the proximal end, and at least two non-threaded regions oriented longitudinally at a radial location on the surface of the body. Each thread region includes at least one thread disposed on the surface of the body. Each non-threaded region disposed between a pair of the thread regions.

In some embodiments, the proximal end extends to about half of the longitudinal length of the connector component.

In some embodiments, at least one of the thread regions extends radially at least 50 degrees about the surface of the body. The thread regions can be disposed radially about the body in a rotationally symmetrical arrangement. In some embodiments, the connector component includes three thread regions. Each thread of a thread region can have a helix angle of about 3 degrees. In some embodiments, the at least one thread of one thread region is discontinuous from the at least one thread of an opposing thread region. The at least one thread of each thread region can extend substantially orthogonal to the longitudinal axis.

In some embodiments, the connector component is coupled to a consumable. The consumable can comprise one of an electrode, a cartridge, or a retaining cap.

In some embodiments, the connector component comprises a male component configured to securely engage a female component. The connector component can further comprise an axial stop disposed radially about the surface of the body between the distal end and the thread regions, the axial stop configured to contact the female component. For example, the male component can be aligned to the female component via the axial stop prior to rotational engagement of the threads. In some embodiments, the connector component is configured to secure a corresponding component. At least one of the non-threaded regions of the connector component can be configured to align with at least one of the thread regions of the corresponding component to facilitate slidable displacement of one component into the other component. To engage the components, one component can be rotatable in relation to the other component in a first direction by a number of degrees less than 360 degrees to secure the other component. To disengage the components, one component can be rotated in relation to the other component in a second direction opposite from the first direction by about the same number of degrees.

In yet another aspect, a consumable connector component is provided for attaching a consumable to a corresponding component of a material processing head. The consumable connector component comprises a cylindrical body including a proximal end and a distal end disposed along a longitudinal axis, a plurality of longitudinally-oriented smooth regions disposed radially about a surface of the body near the proximal end; and a plurality of longitudinally-oriented segments disposed radially about the body interspersed between the smooth regions. Each segment includes at least one thread disposed along the surface of the body such that the at least one thread of one segment is discontinuous from the at least one thread of an opposing segment.

In some embodiments, the proximal end extends to about half of the longitudinal length of the connector component.

In some embodiments, at least one of the segments extends radially at least 50 degrees about the surface of the body. The segments can be disposed radially about the body in a rotationally symmetrical arrangement. In some embodiments, the connector component includes three segments. Each thread of a segment can have a helix angle of about 3 degrees. In some embodiments, the at least one thread of each segment can extend radially about the body.

In some embodiments, the consumable connector component is coupled to a consumable. The consumable can comprise one of an electrode, a cartridge, or a retaining cap.

In some embodiments, the consumable connector component comprises a male component configured to securely engage a female consumable component. The connector component can further comprise an axial stop disposed radially about the surface of the body between the distal end and the segments, the axial stop configured to contact the female consumable component. For example, the male consumable component can be aligned to the female consumable component via the axial stop prior to rotational engagement of the threads. In some embodiments, the consumable connector component is configured to secure a corresponding component. At least one of the smooth regions of the consumable connector component can be configured to align with at least one of the segments of the corresponding component to facilitate slidable displacement of one component into the other component. To engage the components, one component can be rotatable in relation to the other component in a first direction by a number of degrees less than 360 degrees to secure the other component. To disengage the components, one component can be rotated in relation to the other component in a second direction opposite from the first direction by about the same number of degrees.

In yet another aspect, a method is provided for engaging a first component and a second component for a material processing head. The first and second components each has i) at least one thread region having at least one thread and ii) at least one slotted region characterized by the absence of threads. The method includes aligning radially the at least one thread region of the first component with the at least one slotted region of the second component, sliding the first component relative to the second component longitudinally in the radially aligned position, and rotating the first component in one direction relative to the second component to engage the at least one thread of the thread region of the first component with the at least one thread of the thread region of the second component to secure the first and second components relative to one another.

The method can further include aligning radially the at least one slotted region of the first component with the at least one thread region of the second component prior to sliding the first component into the second component. In some embodiments, sliding the first component into the second component comprises axially abutting the first component and the second component.

The method can further include preventing the first component from rotating with respect to the second component during the sliding, engaging a gap of the first component with a rim of the second component, and rotating the first component relative to the second component in one direction after the engaging. In some embodiments, rotating the first component relative to the second component comprises rotating the first component by a number of degrees less than 360°. The number of degrees can be one of less than or equal to about 60°, 90° or 180°. In some embodiments, the method further includes rotating the first component relative to the second component in an opposite direction by about the same number of degrees to disengage the two components. During disengagement, the first component can be prevented from rotating further in the opposite direction when an edge of a thread region of the first component encounters an opposing face of a thread region of the second component in the rotational path.

In some embodiments, at least one of the first component or the second component is coupled to a consumable of the plasma arc torch.

In another aspect, the present invention features a connector component configured for coupling a consumable component to a plasma arc torch. The connector component comprises a body having a proximal end and a distal end disposed along and defining a longitudinal axis. The connector component also includes at least two engagement regions disposed radially about the longitudinal axis on a surface of the body. Each engagement region includes at least one engagement feature disposed on the surface of the body. The connector component further includes at least two free regions disposed radially about the longitudinal axis on the surface of the body. Each free region is radially located between a pair of the engagement regions and each free region is characterized by an absence of the engagement features. The at least one engagement feature in a first engagement region of the at least two engagement regions creates a discontinuous rotational path with the at least one engagement feature of an adjacent engagement region of the at least two engagement regions. The at least one engagement feature of the first region includes a structure extending from the body that engages with a corresponding connector component of the plasma arc torch.

In some embodiments, the at least one engagement feature of each engagement region comprises a plurality of engagement features with a gap between a pair of the engagement features. The plurality of engagement features of each engagement region creates a continuous rotational path within the engagement region, but not with the engagement features of another engagement region. Alternatively, a first engagement feature of the plurality of engagement features of an engagement region forms the discontinuous rotational path with an adjacent engagement feature of the plurality of engagement features of the engagement region. In some embodiments, the plurality of engagement features of an engagement region comprises a plurality of threads having different pitches. In some embodiments, the plurality of engagement features of an engagement region comprises two bosses.

In some embodiments, the at least one engagement feature comprises a curved thread. The curved thread can have a convex curvature in a direction toward the distal end. The curved thread can have a convex curvature in a direction toward the proximal end. In some embodiments, the at least one engagement feature comprises a nub. In some embodiments, the at least one engagement feature comprises a slot.

In some embodiments, at least one the free regions include a feature that is physically continuous between the adjacent engagement features without establishing a continuous rotational path between the adjacent engagement features.

In some embodiments, the connector component comprises a male component configured to engage a female component. The connector component can further comprise an axial stop disposed radially about the surface of the body between the distal end and the engagement regions. The axial stop is configured to contact the female component when the connector component advances inside of the female component. The male component can align with the female component via the axial stop prior to rotational engagement of the engagement features between the male and female components.

In some embodiments, at least one of the free regions of the connector component is configured to align with at least one of the engagement regions of the corresponding component to facilitate slidable displacement of one component relative to the other component along the longitudinal axis.

In some embodiments, one component is rotatable in relation to the other component in a first direction by a number of degrees less than 360 degrees, thereby permitting fixed engagement with the other component. In some embodiments, the components are disengaged when one component is rotated in relation to the other component in a second direction opposite from the first direction by about the same number of degrees of rotation about the longitudinal axis.

In some embodiments, the consumable component comprises one of an electrode, a cartridge, a nozzle or a retaining cap. In some embodiments, the connector component consists of two engagement regions. In some embodiments, the at least two engagement regions are radially symmetrical about the longitudinal axis. In some embodiment, the at least two engagement regions are radially asymmetrical about the longitudinal axis.

In another aspect, the present invention features a connector component configured for coupling an electrode to a plasma arc torch. The connector component comprises a body having a proximal end and a distal end disposed along and defining a longitudinal axis. The connector component also includes at least two engagement regions disposed radially about the longitudinal axis on a surface of the body near the proximal end. Each engagement region includes at least one engagement means disposed on the surface of the body. The engagement means is adapted to mate with a corresponding engagement means of a corresponding connector component of the plasma arc torch to secure the connector component by engaging with the corresponding connector component of the plasma arc torch. The connector component also includes at least two free regions disposed radially about the longitudinal axis on the surface of the body. Each free region is radially located between a pair of the engagement means. The at least one engagement means in a first engagement region of the at least two engagement regions does not create a continuous rotational path with the at least one engagement means of an adjacent engagement region of the at least two engagement regions.

In some embodiments, the at least one engagement means comprises a curved thread. In some embodiments, the at least one engagement means comprises a nub. In some embodiments, the at least one engagement means comprises a slot.

In some embodiments, the at least one engagement means of each engagement region comprises a plurality of engagement means with a gap between a pair of the engagement means. The plurality of engagement means of an engagement region can comprise a plurality of threads having different pitches. The plurality of engagement means of an engagement region can comprise two bosses.

In another aspect, the present invention features a method for engaging a first component and a second component for a material processing head. The first and second components each has i) at least one engagement region having at least one engagement feature and ii) at least one free region characterized by the absence of an engagement feature. The method comprises radially aligning the at least one engagement region of the first component with the at least one free region of the second component, sliding the first component relative to the second component longitudinally in the radially aligned position, and axially abutting the first component and the second component. The method also includes rotating the first component in one direction relative to the second component to engage the at least one engagement feature of the engagement region of the first component with the at least one engagement feature of the engagement region of the second component to secure the first and second components relative to one another. The method further includes preventing the first component from rotating further in the one direction relative to the second component after the engagement.

In yet another aspect, the present invention features a connector component configured for coupling a consumable component to a plasma arc torch. The connector component comprises at least one engagement region disposed radially about the longitudinal axis on a surface of the body. The at least one engagement region includes at least one engagement feature disposed on the surface of the body. The connector component also includes at least one free region disposed radially about the longitudinal axis on the surface of the body adjacent to the at least one engagement region. The at least one free region is characterized by an absence of the engagement feature. The at least one engagement feature of the at least one engagement region includes a structure extending from the body that engages with a corresponding engagement feature of a corresponding connector component of the plasma arc torch.

It should also be understood that various aspects and embodiments of the invention can be combined in various ways. Based on the teachings of this specification, a person of ordinary skill in the art can readily determine how to combine these various embodiments. For example, in some embodiments, any of the aspects above can include one or more of the above features. One embodiment of the invention can provide all of the above features and advantages.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 26 shows yet another exemplary male connector component configured to engage the female connector component of FIGS. 7 and 9A and 9B.

FIG. 27 shows the cross-sectional view of yet another exemplary male connector component configured to engage the female connector component of FIGS. 7 and 9A and 9B.

FIG. 28 shows the cross-sectional view of yet another exemplary male connector component configured to engage the female connector component of FIGS. 7 and 9A and 9B.

DETAILED DESCRIPTION OF THE INVENTION

Figure 1:
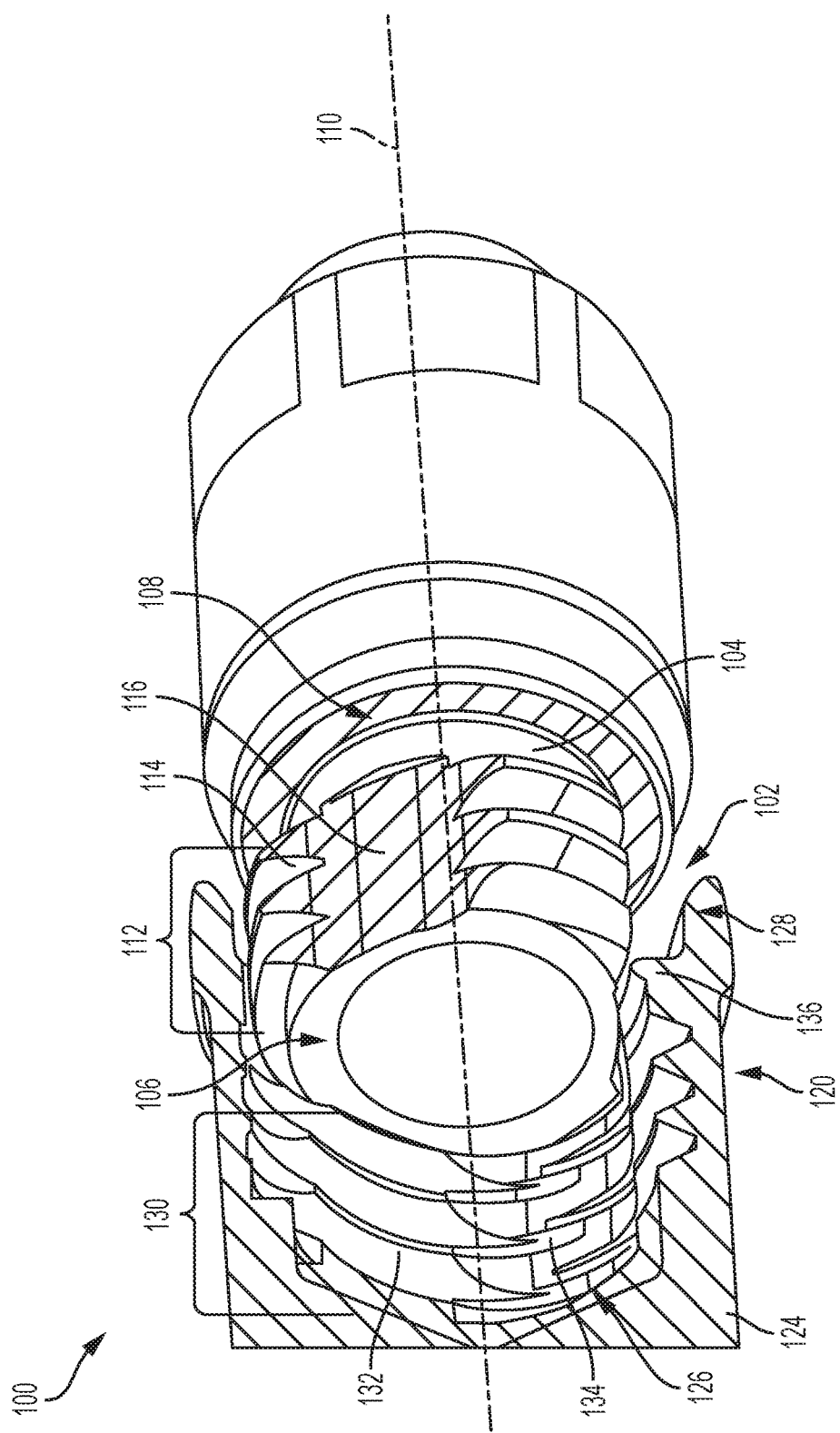
FIG. 1 illustrates an exemplary connector assembly, according to some embodiments of the present invention.

Technologies of the present invention allow torch consumables to be installed and removed faster and easier than standard threaded connections, such as with fewer rotations and/or reduced number of rotational degrees. Technologies of the present invention are applicable to connection of various components in a material processing head, such as a plasma arc torch, laser head, or waterjet cutting head. FIG. 1 illustrates an exemplary connector assembly, according to some embodiments of the present invention. The connector assembly 100 includes a male connector component 102 and a female connector component 120, both of which are configured for assembly into a torch (not shown). In some embodiments, each of the connector components 102, 120 is coupled to a consumable for attachment to one another. Exemplary consumables to which a connector component can be coupled include an electrode, nozzle, retaining cap, shield or torch body. As an example, the female connector component 120 can be integrally constructed on a torch body while the male connector component 102 can be integrally constructed on a nozzle or an electrode for secure engagement with the torch body.

As shown in FIG. 1, the male connector component 102 includes a body 104 having a proximal end 106 and a distal end 108 disposed along a longitudinal axis 110. The proximal end 106 of the male connector component 102 can be characterized as the end that encounters the female connector component 120 first as the male connector component 102 advances into female connector component 120 for engagement. At least two thread regions 112 are disposed radially about the longitudinal axis 110 on an outer surface of the body 104 near the proximal end 106. Each thread region 112 includes at least two parallel threads 114 disposed on the outer surface of the body 104. In some embodiments, the threads 114 are evenly spaced relative to each other and substantially orthogonal to the longitudinal axis 110. In some embodiments, the threads 114 are substantially evenly spaced relative to each other and oriented substantially helically about the longitudinal axis 110. In addition, the male connector component 102 includes at least two smooth regions 116 characterized by the absence of threads or other non-regular features. Each smooth region 116 is disposed radially about the longitudinal axis 110 between a pair of thread regions 112 on the outer surface of the body 104.

Similarly, the female connector component 120 includes a body 124 having a proximal end 126 and a distal end 128 disposed along the longitudinal axis 110. The proximal end 126 of the female connector component 120 is characterized as the end that encounters the male connector component 102 first as the female connector component 120 advances towards the male connector component 102 during engagement. At least two thread regions 130 are disposed radially about the longitudinal axis 110 on an inner surface of the body 124 near the proximal end 126. Each thread region 130 can include at least two parallel threads 132 disposed on the inner surface of the body 124. In some embodiments, these threads 132 are evenly spaced relatively to each other and substantially orthogonal to the longitudinal axis 110. In some embodiments, the threads 132 are substantially evenly spaced relative to each other and oriented substantially helically about the longitudinal axis 110. In addition, the female connector component 120 includes at least two smooth regions 134 characterized by the absence of threads or other non-regular features. Each smooth region 134 is disposed radially about the longitudinal axis 110 between a pair of thread regions 130 on the surface of the body 124. In general, the female connector component 120 includes complementary features in comparison to the male connector component 102 to facilitate the secure engagement of the two components.

In some embodiments, each smooth region 116 of the male connector component 102 is appropriately dimensioned such that it functions as a slot for aligning with and receiving a thread region 130 of the female connector component 120. The radial extent of the smooth region 116 can be substantially the same as the radial extent of the thread region 130. Conversely, each smooth region 134 of the female connector component 120 is appropriately dimensioned such that it functions as a slot for aligning with and receiving a thread region 112 of the male connector component 102. The radial extent of the smooth region 134 can be substantially the same as the radial extent of the thread region 112. The smooth regions 116 of the male connector component 102 and the smooth regions 134 of the female connector component 120 can guide the slidable displacement of one component in relation to the other component in the longitudinal direction 110, both during engagement and disengagement.

Figure 2A:
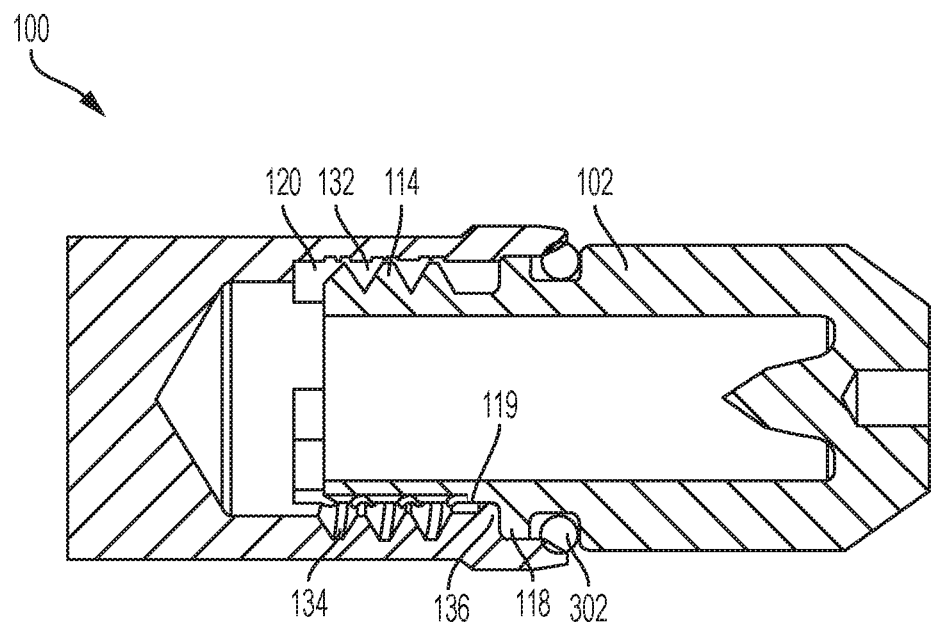
FIGS. 2A and B illustrate various views of the connector assembly of FIG. 1 in the inserted position, according to some embodiments of the present invention.
Figure 2B:
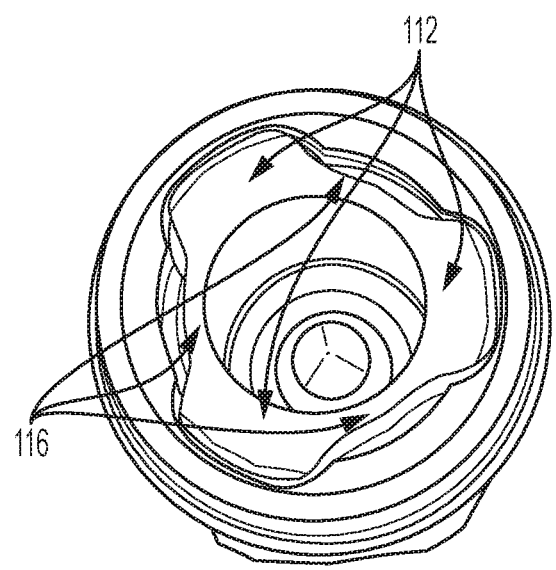

In some embodiments, rotational engagement between the male connector components 102 and the female connector component 120 is only allowed after the male connector component 102 slides to a stopping position within the female connector component 120 in the longitudinal direction 110. This position is hereinafter referred to as the "inserted position," which is prior to the occurrence of rotation. FIGS. 2A and B illustrate various views of the connector assembly of FIG. 1 in the inserted position, according to some embodiments of the present invention. As shown in FIG. 2A, the male component 102 includes a flange 118 disposed at the distal end 108 of the body 104, and the female component 120 includes a stopping rim 136 disposed at the distal end 128 of the body 124. The flange 118 and the stopping rim 136 are configured to interact with each other to prevent further advancement of the male connector component 102 beyond the stopping rim 136 of the female connector component 120 in the longitudinal direction 110. In addition, no rotation of the male connector component 102 within the female connector component 120 can occur during the advancement due to misalignment of the threads 114, 132 on the two components. Rotation is only permitted after the male connector component 102 is fully inserted in the female connector component 120 and the stopping rim 136 of the female connector component 120 locks into position with a rim gap 119 of the male connector component 102, at which point threads 114 on the male connector component 102 are properly positioned relative to the threads 132 on the female connector component 120 to permit threading. In the inserted position, as shown in FIG. 2B, each thread region 112 of the male connector component 102 faces a smooth region (not shown) of the female connector component 120 and each smooth region 116 of the male connector component 102 faces a thread region (not shown) of the female connector component 120.

Figure 3A:
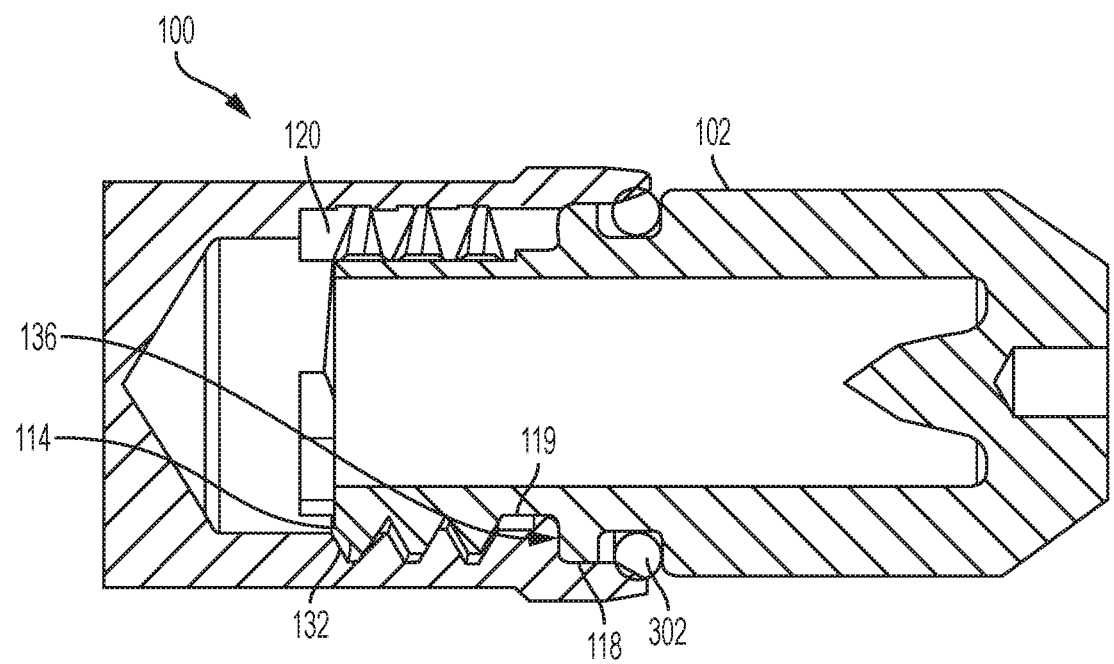
FIGS. 3A and B illustrate various views of the connector assembly of FIG. 1 in the locked position, according to some embodiments of the present invention.
Figure 3B:
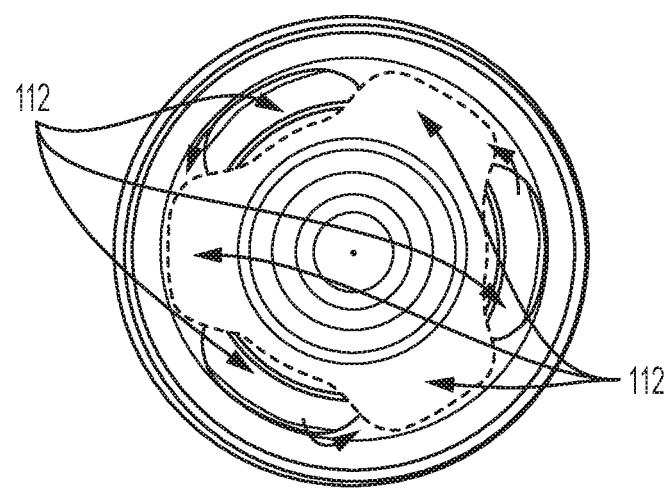

Once the inserted position is reached, one connector component is rotatable in relation to the other connector component in a direction (i.e., clock-wise or counter-clock-wise) by a number of degrees less than 360° before the components are securely fastened to each other. This position is hereinafter referred to as the "locked position." In contrast, traditional threaded designs require rotation of at least 360° before being able to securely engage two components. FIGS. 3A and B illustrate various views of the connector assembly of FIG. 1 in the locked position, according to some embodiments of the present invention. To secure the components, the male connector component 102 can be rotated within the female connector component 120 such that the threads 114 of at least one thread region 112 of the male connector component 102 lock into position with the threads 132 of an adjacent thread region 130 of the female connector component 120 in the rotational path, as shown in FIG. 3A. The interlocking between the threads facilitates engagement and prevents further rotation. Thus, during engagement, threads in one, or more, or all of the thread regions of the components can be engaged simultaneously with one rotation of less than 360°. FIG. 3B illustrates that, to reach the locked position, the male connector component 102 is rotated in a counter-clock wise direction by less than or equal to 60 degrees from the inserted position. In other embodiments, engagement between the two components can be achieved by rotation in a clockwise direction. In the locked position, each thread region 112 of the male connector component 102 faces a thread region (not shown) of the female connector component 120 and each smooth region (not shown) of the male connector component 102 faces a smooth region (not shown) of the female connector component 120.

To disengage the two components (i.e., moving from the locked position to the inserted position), an operator can rotate one component in relation to the other component in a direction opposite from the direction of engagement by about the same number of degrees. Thus, during disengagement, threads in one, or more, or all thread regions of the connector components can be disengaged simultaneously with one rotation of less than 360°. When the inserted position is reached upon disengagement, each thread region 112 of the male connector component 102 again faces a smooth region 134 of the female connector component 120 and vise versa. The inserted position facilitates the slideably displacement of the male connector component 102 out of the female connector component 120.

In some embodiments, each thread 132 on the female connector component 120 is wider longitudinally than a standard thread so as to allow the corresponding thread 114 on the male connector component 102 to engage over a wider axial range. In some embodiments, each female thread 132 is a 16-pitch thread, which translates to an axial shift along the longitudinal direction 110 of about 0.010 inch when rotated about 60° between the inserted position and the locked position. In some embodiments, the wider width of the female threads 132 is adapted to prevent accidental engagement with the male threads 114 when in the inserted position (i.e., prior to rotation to the locked position). Otherwise, the male threads 114 can extend beyond the entrance of the groove of the adjacent female threads 132 even in the inserted position, thus unintentionally locking the components to each other. In alternative embodiments, however, threads of the two components can be engaged before reaching the locked position.

In some embodiments, the threads of one thread region are discontinuous from the threads of an adjacent thread region for each of the connector components 102, 120. That is, for each connector component, the pitch of each thread does not create a continuous path from one thread region to the next. This is to prevent the threads of one thread region of one component from accidentally engaging the threads of an adjacent thread region of the other component in the rotational path during disengagement. Specifically, during disengagement, when male threads 114 of a thread region 112 is rotated back to the inserted position, the male threads 114 are prevented from further engagement with the female threads 132 of an adjacent thread region 130 in the rotational path because the male threads 114 cannot align with the adjacent female thread 132.

In general, the degree of rotation required for maximum engagement of the female connector component 120 and the male connector component 102 is dependent the number of thread regions and smooth regions disposed on a body of each component. For example, if each component has one smooth region and one thread region, the degree of rotation is 180°. If each component has two smooth regions and two thread regions, the degree of rotation is 90°. If each component has three smooth regions and three thread regions, the degree of rotation is about 60°. FIGS. 1 to 3B show that the male connector component 102 includes three thread regions 112 interspersed among three smooth regions 116, such that each thread region 112 is between a pair of smooth regions 116. In a complementary fashion, the female connector component 120 includes three thread regions 130 interspersed among three smooth regions 134, such that each thread region 130 is between a pair of smooth regions 134. To minimize the degree of rotation required to join the female and male connector component, an even higher number of smooth regions and/or thread regions per connector component is possible. In addition to the number of thread and/or smooth regions, the amount of rotation is also dependent on the tolerances and locations of the threads.

One possible limitation associated with applying a small number of degrees of rotation (e.g., about 60°) for engagement is that it may be difficult to use the threading motion to convert rotational force into axial force so to overcome resistance (e.g., O-ring friction) generated from insertion over a relatively long longitudinal distance. The severity of the resistance depends on a number of factors, including the type of resistance, the size of the parts and the thread pitch. In some embodiments, a tapered O-ring seal 302 is used to reduce the length of resistance and allow the components to be easily inserted to the required depth.

Figure 4A:
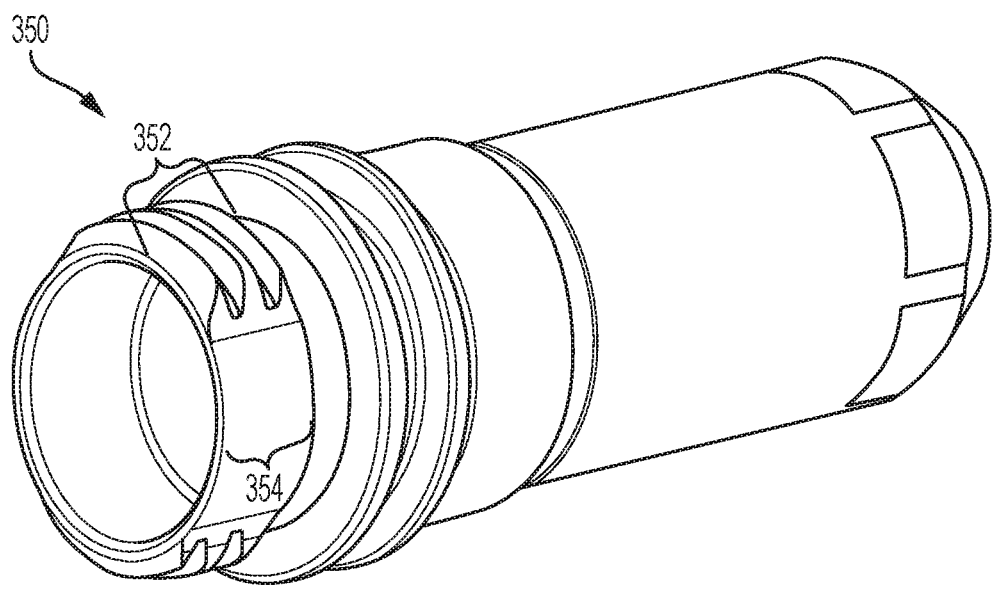
FIGS. 4A and B illustrate another exemplary set of female and male connector components, according to some embodiments of the present invention.
Figure 4B:
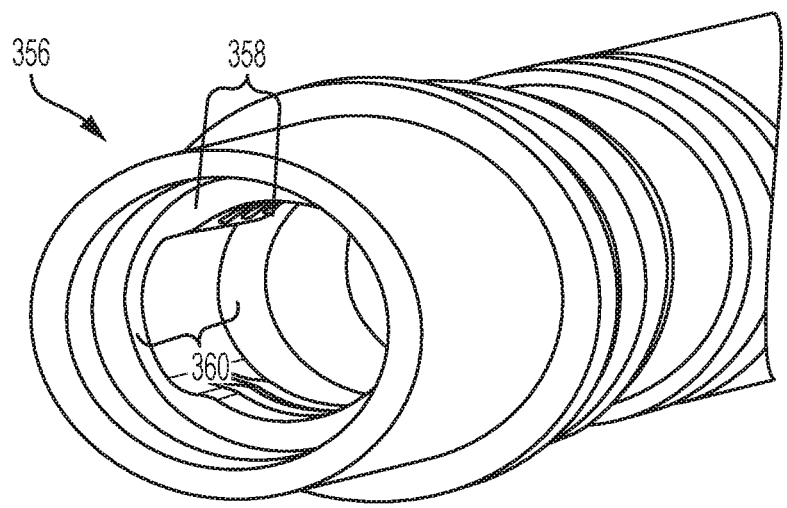

FIGS. 4A and B illustrate another exemplary set of female and male connector components, respectively, according to some embodiments of the present invention. As shown, the male connector component 350 of FIG. 4A includes two thread regions 352 and two smooth regions 354 on an exterior surface of the component. Similarly, the female connector component 356 of FIG. 4B include two thread regions 358 and two smooth regions 360 on an interior surface of the component. The male and female connector components 350, 356 function similarly to the corresponding components of the connector assembly 100 described above with reference to FIGS. 1 to 3B, except a rotation of less than or equal to about 90° can be applied to achieve engagement and disengagement between the connector components, 350, 356. This is due to the presence of two thread regions/smooth regions on each connector component in comparison to three thread regions/smooth regions associated with the connector assembly 100.

The connector assembly of FIG. 1 or 4A can be constructed by modifying a standard thread profile or using a custom profile. To customize the design of each connector component, one or more identical thread regions can be fabricated on a smooth component body in various rotational positions, such as in three different rotational positions if three thread regions per component is desired. In some embodiments, during the machining process of each component, the threads in each thread region is properly spaced from the stop structure (i.e., a stop rim 136 for the female connector component 120 or a flange 118 for the male connector component 102 of connector assembly 100) to ensure interchangeability over the life of the components.

In some embodiments, to ensure interchangeability of the components and rotational symmetry during the engagement/disengagement process, the thread regions of each connector component are configured to be rotationally symmetrical about the body of the connector component. Similarly, the smooth regions are also radially disposed about the body in a rotationally symmetrical manner. In addition, the location and orientation of the threads on one thread region of a component can be substantially the same as those of another thread region of the same component or that of a mating component. This means that the threads are fabricated in identical sections as oppose to continuous threads. In some embodiments, thread milling is used to produce the thread sections on both the female connector component 120 and the male connector component 102. The radially-symmetrical geometry of the connector components suggest that the male connector component 102 can be inserted into the female connector component 120 for engagement in multiple rotational positions, depending on the number of thread regions/smooth regions present.

Figure 5:
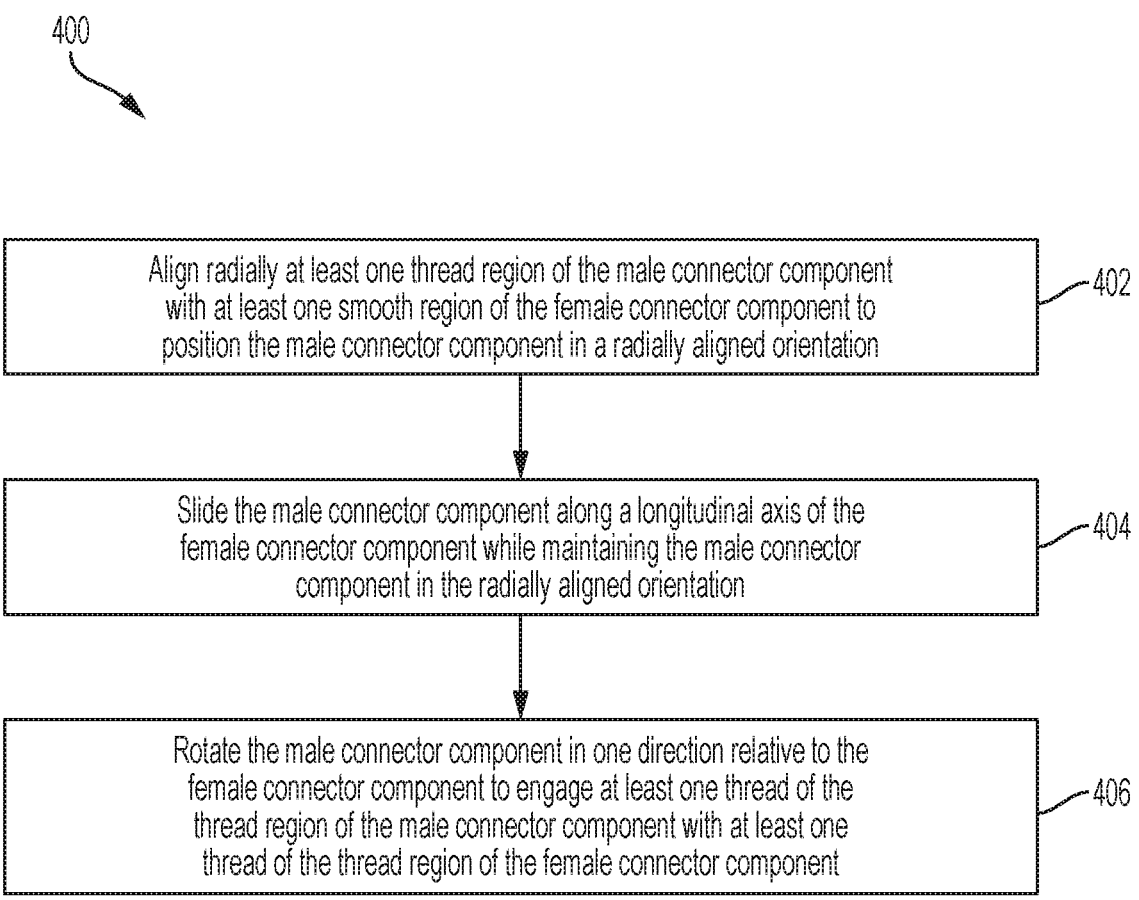
FIG. 5 illustrates a method for securing a male connector component to a female connector component, according to some embodiments of the present invention.

FIG. 5 illustrates a method 400 for securing a male connector component to a female connector component, such as the male connector component 102 to the female connector component 120 of FIG. 1, according to some embodiments of the present invention. At step 402, each of the thread regions 112 of the male connector component 102 is radially aligned with a smooth region 134 of the female connector component 120. Conversely, each of the smooth regions 116 of the male connector component 102 can be radially aligned with a thread region 130 of the female connector component 120. In some embodiments, the thread regions of both the female connector component 120 and the male connector component 102 are about identical. That is, the location and orientation of the threads on one thread region are substantially the same as those of a different thread region associated with the same or different components. In addition, the thread regions and smooth regions can be rotationally symmetrical about each of the components. In view of such geometry, the radial alignment between the components at step 402 can be achieved in several rotational positions, relatively independent of the angle of insertion of the male connector component 102 into the female connector component 120.

At step 404, the male connector component 102 is inserted along the longitudinal direction 110 into the female connector component 120 while being maintained in the radially aligned orientation. The insertion can be accomplished without any rotation. In some embodiments, the sliding stops when the flange 118 of the male connector component 102 encounters the stop rim 136 of the female connector component 120 (i.e., the inserted position). In some embodiments, the two components are prevented from rotating relative to each other until the inserted position is reached and the stopping rim 136 locks into position with the rim gap 119, at which point the threads of the two components are aligned to permit rotation.

At the inserted position of step 406, the male connector component 102 is rotated in one direction relative to the female connector component 120 to lock the threads 114 of at least one thread region 112 of the male connector component 102 with the threads 132 of an adjacent thread region 130 of the female connector component 120 in the rotational path, thereby securing the components to one another. The amount of rotation required to achieve maximum engagement at the locked position can be less than 360°, such as less than or equal to about 60°, 90° or 180°.

To disengage the components, the male connector component 102 can be rotated relative to the female connector component 120 in an opposite direction by about the same number of degrees as the rotation used during the engagement process. While disengaging, the male connector component 102 is prevented from rotating further in the opposite direction in the female connector component 120 when an edge of a thread region 112 of the male component 102 encounters an edge of a thread region 130 of the female component 120 in the rotational path.

Even though the method of FIG. 5 is described with the male connector component 102 being rotatable relative to the female connector component 120 during both the engagement and disengagement processes, the female connector component 120 can also be rotated with respect to the male connector component 102 to achieve the same effects.

Figure 6:
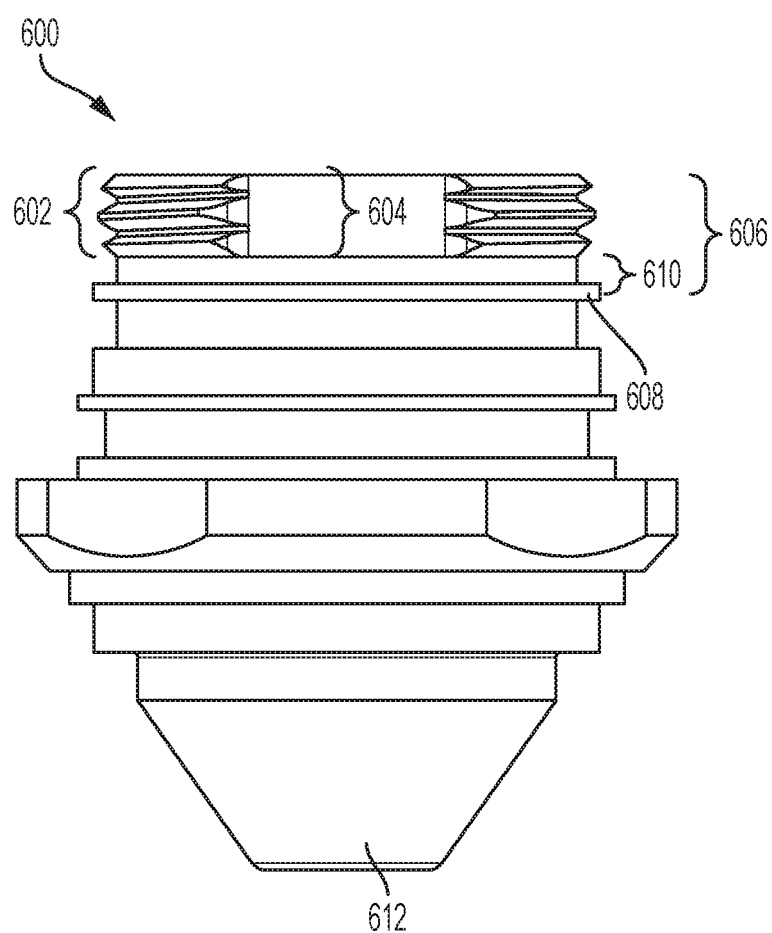
FIG. 6 illustrates an exemplary connector component associated with a nozzle, according to some embodiments of the present invention.

FIG. 6 illustrates an exemplary nozzle having a connector component disposed thereon, according to some embodiments of the present invention. As shown, the nozzle 600 includes a male connector component 606 disposed at the distal end of the nozzle 600 away from the nozzle tip 612. The male connector component 606 is configured to engage with a female connector component (not shown). The male connector component 606 can be integrally constructed from the body of the nozzle 600 or comprise a separate structure coupled to the nozzle 600. The male connector component 606 has two thread regions 602 and two smooth regions 604. The male connector component 606 also includes a flange 608 for interacting with a stopping rim (not shown) of a female connector component to prevent the male connector component 606 from further advancing inside of the female connector component when in the inserted position. The male connector component 606 additionally includes a rim gap 610 for interlocking with a stopping rim of the female connector component to permit rotation of the male connector component 606 inside of the female connector component when the inserted position is reached. Rotation from the inserted position to the locked position is also facilitated by the alignment of the thread regions 602 of the male connector component 606 with corresponding adjacent thread regions (not shown) of the female connector component in the rotational path.

Figure 7:
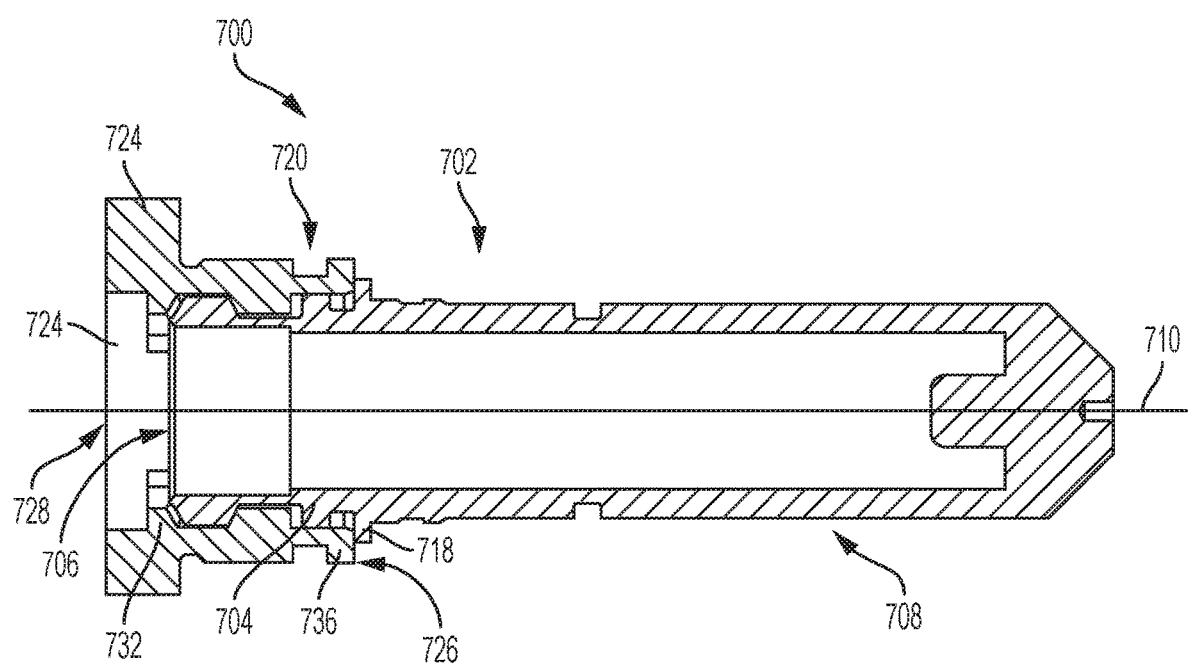
FIG. 7 illustrates another exemplary connector assembly including a male connector component and a female connector component, according to some embodiments of the present invention.

FIG. 7 illustrates another exemplary connector assembly including a male connector component and a female connector component, according to some embodiments of the present invention. The connector assembly 700 includes a male connector component 702 and a female connector component 720, both of which are configured for assembly into a material processing head (not shown), such as a plasma arc torch, water jet cutting head, or laser cutting head. In some embodiments, each of the connector components 702, 720 is coupled to (or a part of) a consumable for attachment to one another. Exemplary consumables to which a connector component can be associated with include electrode, nozzle, retaining cap, shield or torch body.

Figure 8A:
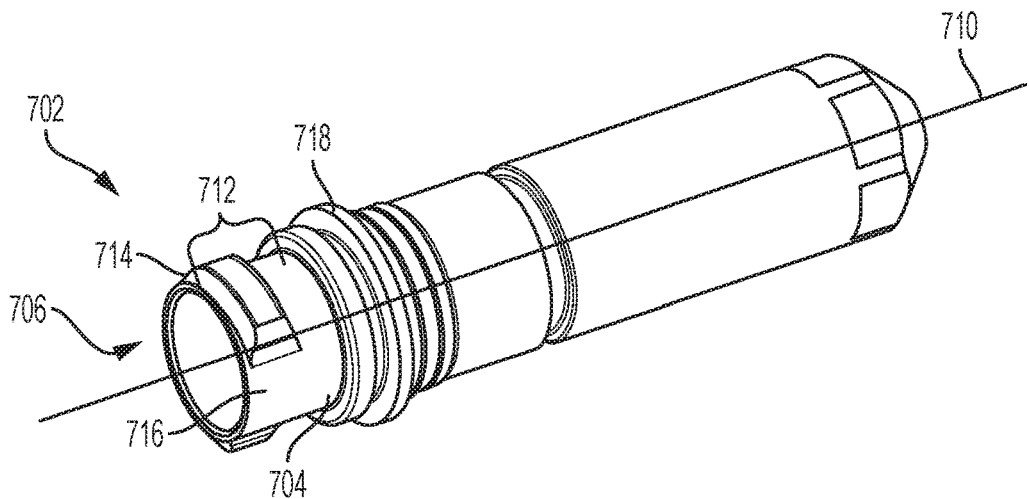
FIGS. 8A-C illustrate various views of the male connector component of FIG. 7.
Figure 8B:
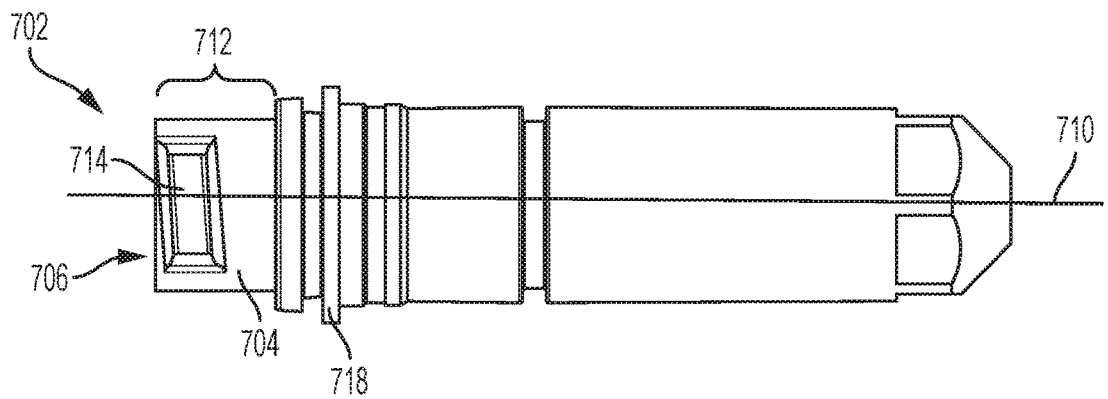
Figure 8C:
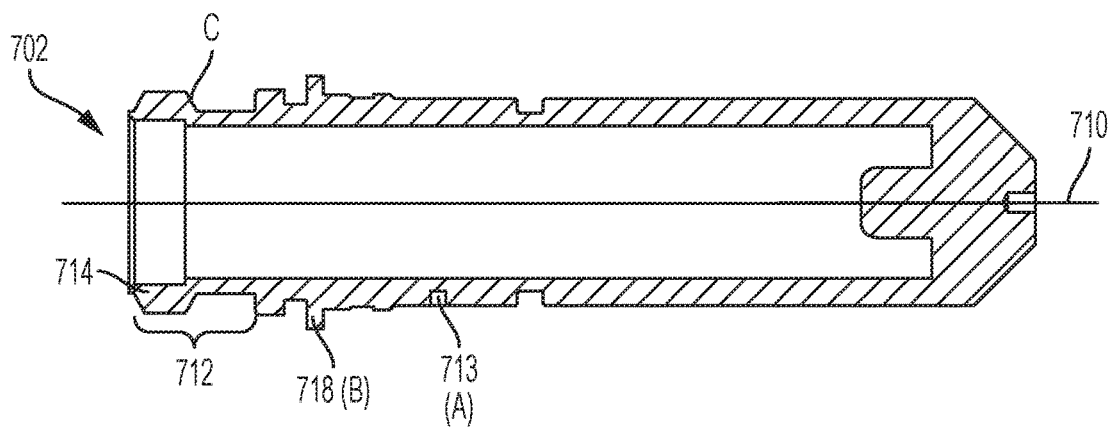

The male connector component 702 includes a body 704 that has a proximal end 706 and a distal end 708 disposed along a longitudinal axis 710. The proximal end 706 of the male connector component 702 can be characterized as the end that encounters the female connector component 720 first when the male connector component 702 advances into female connector component 720 for engagement. The proximal end 706 can extend up to about half of the longitudinal length of the male connector component 702. FIGS. 8A-C illustrate various views of the male connector component 702 of FIG. 7. As shown, at least one thread region 712 is disposed radially about a portion of the longitudinal axis 710 on an external surface of the body 704 near the proximal end 706. Each thread region 712 includes at least one thread 714 disposed on the external surface of the body 704. In some embodiments, the thread 714 is oriented substantially orthogonal to the longitudinal axis 710. In some embodiments, the thread 714 is oriented substantially helically about the longitudinal axis 710. For example, the thread 714 can have a helix angle of about 3 degrees. In some embodiments, the thread 714 extends at least 50 degrees radially about the external surface of the body 704. In addition, the male connector component 702 includes at least one smooth region 716 (i.e., non-threaded region) characterized by the absence of threads or other non-regular features. Each smooth region 716 is disposed radially about the longitudinal axis 710 adjacent to at least one thread region 712 on the external surface of the body 704. Even though FIGS. 8A-C show that the male connector component 702 has two thread regions 712 and two smooth regions 716 interposed between the pair of thread regions 712, in other embodiments, a male connector component 702 can have more or fewer smooth regions 716 and thread regions 712 (e.g., only one thread region 712 adjacent to one smooth region 716).

Figure 9A:
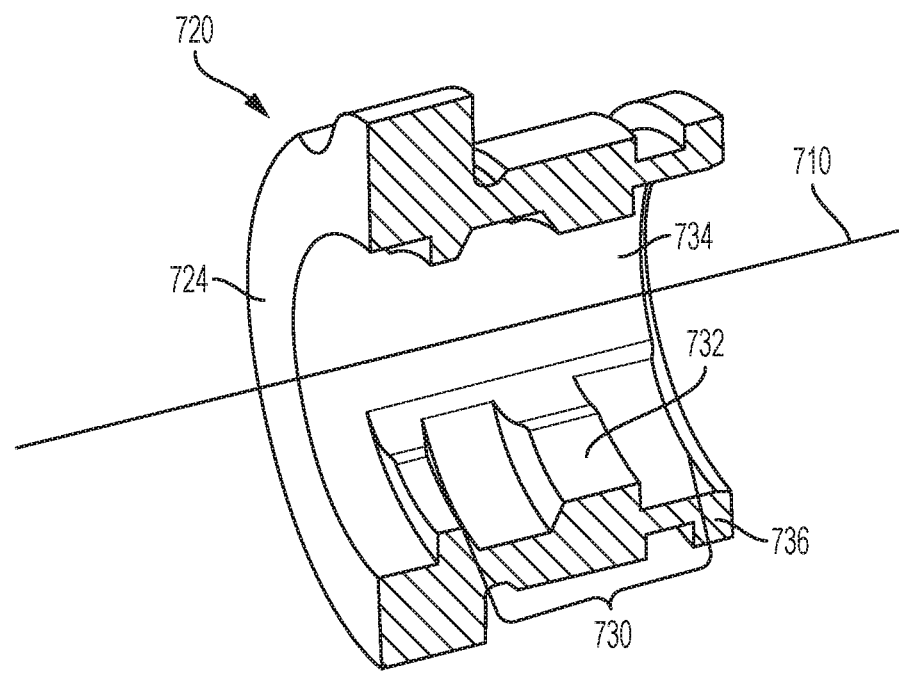
FIGS. 9A and B illustrate various views of the female connector component of FIG. 7.

Referring to FIG. 7, similar to the male connector component 702, the female connector component 720 includes a body 724 having a proximal end 726 and a distal end 728 disposed along the longitudinal axis 710. The proximal end 726 of the female connector component 720 is characterized as the end that encounters the male connector component 702 first when the female connector component 720 advances towards the male connector component 702 during engagement. In some embodiments, the proximal end 726 extends up to about half of the longitudinal length of the female connector component 720. In some embodiments, the proximal end 726 extends up to about 90% of the longitudinal length of the female connector component 720. FIGS. 9A and B illustrate various views of the female connector component 720 of FIG. 7. At least one thread region 730 is disposed radially about the longitudinal axis 710 on an internal surface of the body 724 near the proximal end 726. Each thread region 730 can include at least one thread 732 disposed on the internal surface of the body 724. In some embodiments, the thread 732 is oriented substantially orthogonal to the longitudinal axis 710. In some embodiments, the thread 732 is oriented substantially helically about the longitudinal axis 710. For example, the thread 732 can have a helix angle of about 3 degrees. In some embodiments, the thread 732 extends at least 50 degrees radially about the internal surface of the body 724. In addition, the female connector component 720 includes at least one smooth region 734 (i.e., non-threaded region) characterized by the absence of threads or other non-regular features. Each smooth region 734 is disposed radially about the longitudinal axis 710 adjacent to at least one thread region 730 on the internal surface of the body 724. Even though FIGS. 9A and B show that the female connector component 720 has two thread regions 730 and two smooth regions 734 interposed between the pair of thread regions 730, in other embodiments, a female connector component 720 can have more or fewer smooth regions 734 and thread regions 730 (e.g., only one thread region 730 adjacent to one smooth region 734). In general, the female connector component 720 includes complementary features in comparison to the male connector component 702 to facilitate the secure engagement of the two components.

Each smooth region 716 of the male connector component 702 can be appropriately dimensioned such that it functions as a slot for aligning with and receiving a thread region 730 of the female connector component 720. Conversely, each smooth region 734 of the female connector component 720 is appropriately dimensioned such that it functions as a slot for aligning with and receiving a thread region 712 of the male connector component 702. For each connector component, the thread regions and the smooth regions can be disposed radially about the respective connector component body in a rotationally symmetrical arrangement. In some embodiments, the radial extent of a smooth region 716 of the male connector component 702 is substantially the same as the radial extent of a thread region 730 of the female connector component 720. Similarly, the radial extent of a smooth region 734 of the female connector component 720 is substantially the same as the radial extent of a thread region 712 of the male connector component 702. In general, the smooth region(s) 716 of the male connector component 102 and the smooth region(s) 134 of the female connector component 120 can guide the slidable displacement of one component in relation to the other component in the longitudinal direction 710, both during engagement and disengagement.

Similar to the connector assembly described above with reference to FIGS. 1-3B, the male connector component 702 can include an axial stop 718 disposed radially about the external surface of the connector body 704 between the distal end 708 and the thread region(s) 712. The axial stop 718 is configured to contact a portion of the female connector component 720 during engagement of the two components. For example, the axial stop 718 can help align the female connector component 720 with the male connector component 702 prior to rotational engagement of the respective threads. FIG. 7 shows that the axial stop 718 of the male connector component 702 comprises a flange. The female component 720 includes a stopping rim 736 configured to interact with the flange 718 to prevent further axial advancement of the male connector component 702 within the female connector component 720 in the longitudinal direction 710 after a stopping position, hereinafter referred to as the "inserted position," is reached. In addition, no rotation of the male connector component 702 within the female connector component 720 can occur during the axial advancement prior to reaching the inserted position due to misalignment of the threads 714, 732 on the two components. Instead, during the axial advancement of the male connector component 702 into the female connector component 720 along the longitudinal direction 710, at least one of the smooth regions 716 of the male connector component 702 is configured to align with at least one of the thread regions 730 of the female connector component 720 and vice versa to facilitate slidable axial displacement of one component into the other component. Rotation is only permitted after the male connector component 702 is inserted in the female connector component 720 in the inserted position, where the stopping rim 736 of the female connector component 720 encounters the flange 718, at which point thread(s) 714 on the male connector component 702 are properly positioned relative to the thread(s) 732 on the female connector component 720 to permit rotational engagement (e.g., threading).

Similar to the connector assembly of FIGS. 1-3B, for the connector assembly of FIG. 7, once the inserted position is reached, one connector component is rotatable in relation to the other connector component in a direction (i.e., clockwise or counter-clockwise) by a number of degrees less than 360° before the components are securely fastened to each other, hereinafter referred to as the "locked position." To reach the locked position, as the male connector component 102 is rotated within the female connector component 720, the thread(s) 714 of a thread region 712 of the male connector component 702 can lock into position with the corresponding thread(s) 732 of an adjacent thread region 730 of the female connector component 720 in the rotational path. The interlocking between the threads facilitates engagement and prevents further rotation. In some embodiments, the rotational movement between the connector components to reach the locked position during engagement does not involve any further axial advancement in the longitudinal direction 710. In some embodiments, the rotational movement between the connector components to reach the locked position during engagement is also accompanied by some axial advancement of the male connector component 702 in the female connector component 720 in the longitudinal direction 710. In the locked position, each thread region 712 of the male connector component 702 faces a thread region 732 of the female connector component 720 and each smooth region 716 of the male connector component 702 faces a smooth region 734 of the female connector component 720.

Similarly, to disengage the two components (i.e., moving from the locked position to the inserted position), an operator can rotate one component in relation to the other component in a direction opposite to the direction of engagement by about the same number of degrees. In some embodiments, the rotational movement between the connector components during disengagement does not involve any axial movement in the longitudinal direction 710. In some embodiments, the rotational movement between the connector components during disengagement is accompanied by some axial withdrawal of the male connector component 702 from the female connector component 720 in the longitudinal direction 710. When the inserted position is reached upon disengagement, each thread region 712 of the male connector component 702 again faces a smooth region 734 of the female connector component 720 and vice versa. The inserted position facilitates the slideable displacement of the male connector component 702 out of the female connector component 720 along the longitudinal direction 710. No rotation is permitted when the male connector component 702 slides out of the female connector component 720.

In some embodiments, as shown in FIG. 8C, the male connector component 702 includes a clocking feature 713, such as a recess, disposed in the body 704. The clocking feature 713 provides a reference point for determining where to position the thread 714 along the longitudinal direction 710 during the manufacturing of the component 702. For example, a desired longitudinal distance between the clocking feature 713 (point A) and the pitch diameter (point C) of the thread 714 along the longitudinal direction 710 is used to precisely locate the thread 714 in relation to the clocking feature 713 when manufacturing the connector component. As another example, the longitudinal distance between the axial stop 718 (point B) and the thread 714 at the pitch diameter (point C) can be precisely controlled at the location of the clocking feature 713 (point A). The pitch diameter is the diameter of a cylindrical surface of a thread at which male and female threads engage to achieve the locked position. Hence, the clocking feature 713 allows one to control where the thread 714 starts and where it locks with the corresponding female thread. A similar locating feature (not shown) can be situated in the female connector component 720.

Figure 16A:
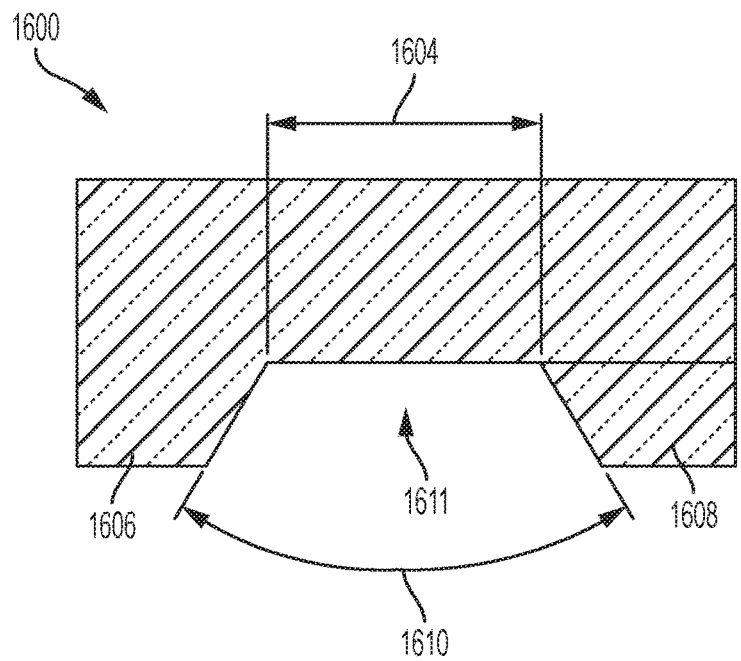
FIGS. 16A and B illustrate the thread profiles of an exemplary set of complimentary connector components.
Figure 16B:
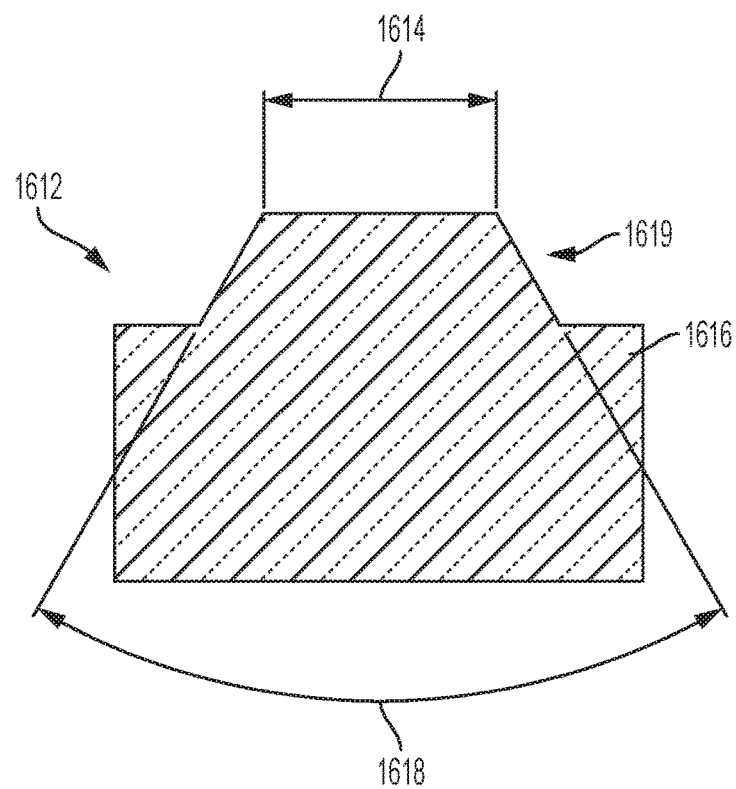

In some embodiments, for each thread of a male connector component 702 and/or a female connector component 720, the circumferential ends of the thread have a rounded contour at its tip (rather than a linear or angular contour). This arcuate shape can reduce burring and assist with thread engagement. In some embodiments, each thread of the male and female connector components is relatively thick, thus less likely to cross thread or otherwise engage in the reverse rotational direction during disengagement, where the thick width of the male and female threads are adapted to block one another and prevent binding. FIGS. 16A and B illustrate the thread profiles of an exemplary set of complementary connector components along a longitudinal (i.e., axial) direction. The connector component 1600 of FIG. 16A can be a male connector component, in which case the connector component 1612 of FIG. 16B is a female connector component. Conversely, the connector component 1600 of FIG. 16A can be a female connector component, in which case the connector component 1612 of FIG. 16B is a male connector component. For the connector component 1600 of FIG. 16A, the axial distance 1604 between the bases of two adjacent threads 1606, 1608 in a thread region can be about 0.095 inches. The angle 1610 between the adjacent tips of the two threads 1606, 1608 can be about 60 degrees. For the connector component 1612 of FIG. 16B, the axial length 1614 of the tip portion 1619 of a thread 1616 can be about 0.08 in. The angle 1618 between the circumferential ends of the thread 1616 can be about 60 degrees. A recess region 1611 between the two adjacent threads 1606, 1608 of the connector component 1600 can be configured to receive the tip portion 1619 of the thread 1616 of the connector component 1612 when the two components are engaged.

In some embodiments, the thread(s) of one thread region is discontinuous from the thread(s) of an adjacent/opposing thread region for each of the connector components 702, 720. That is, for each connector component, the pitch of each thread does not create a continuous helical path from one thread region to the next. In addition, for a connector component, a thread of one thread region is physically and orientationally separate from another thread of an adjacent/opposing thread region. This is to prevent the thread of one thread region of one component from accidentally engaging the thread of an adjacent/opposing thread region of the other component in the rotational path during disengagement. Specifically, during disengagement, when a male thread 714 of a thread region 712 is rotated back to the inserted position, the male thread 714 is prevented from further engagement with the female thread 732 of an adjacent/opposing thread region 730 in the rotational path because the male thread 714 cannot align with that female thread 732.

In general, the degree of rotation required for maximum engagement and/or disengagement of the female connector component 720 and the male connector component 702 is dependent on the number of thread regions and smooth regions disposed on the body of each component. For example, if there is one thread region and one smooth region on each of the male and female connector components, the threads of these components can be engaged and/or disengaged with one rotation of about 180° or less, such as 90°. If there are two thread regions on each of the male and female connector components, the threads of these components can be engaged and/or disengaged with one rotation of about 90°. FIGS. 7-9B show that the male connector component 702 and the female connector component 720 each includes two thread regions interspersed among two smooth regions, such that each thread region is between a pair of smooth regions. In other embodiments, the male connector component 702 and the female connector component 720 each includes only one thread region adjacent to only one smooth region. In addition, each thread region of the male connector component 702 and the female connector component 720 can include one or more threads.

Figure 10A:
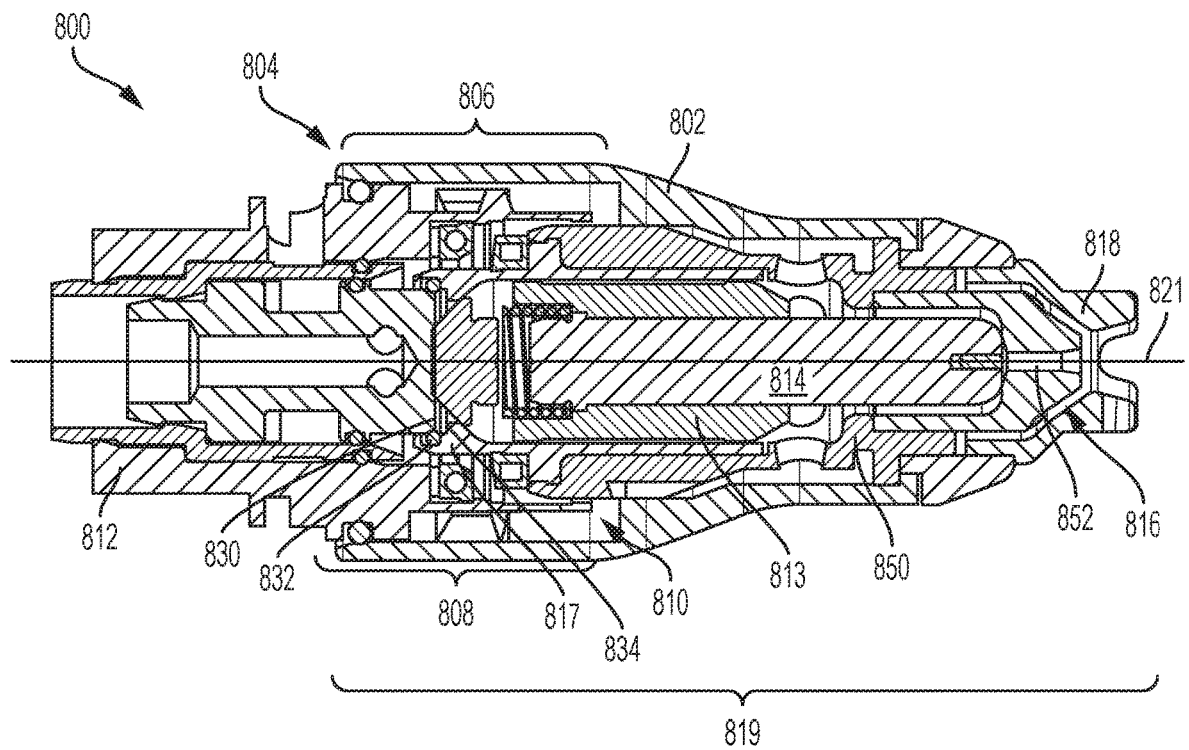
FIGS. 10A and B illustrate another exemplary connector assembly associated with a plasma arc torch, according to some embodiments of the present invention.
Figure 10B:
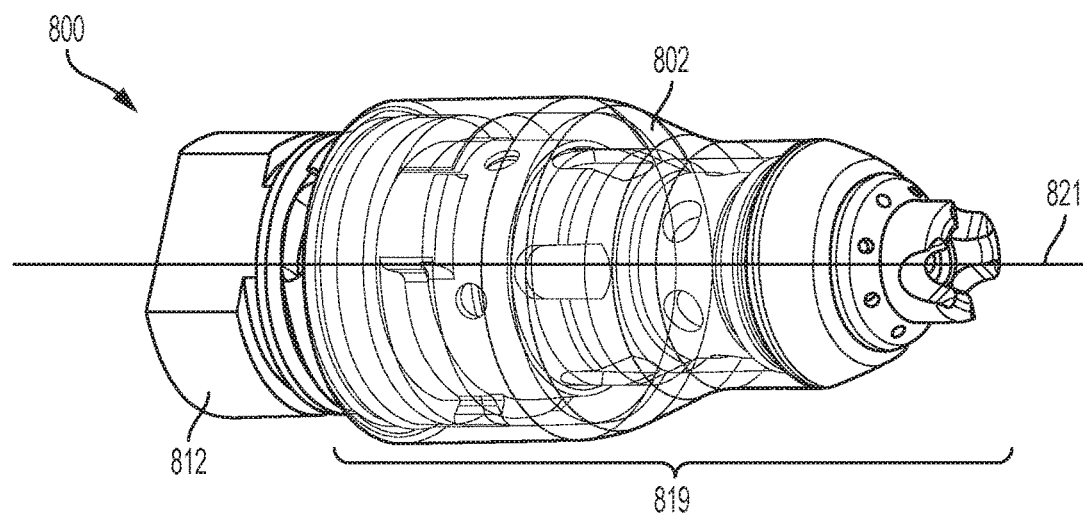

FIGS. 10A and B illustrate another exemplary connector assembly associated with a plasma arc torch 800, according to some embodiments of the present invention. As shown, a torch body 812 includes a male connector component 808 that is disposed at the proximal end 810 of the torch body 812. The male connector component 808 is configured to engage a female connector component 806 disposed at the proximal end 804 of a retaining cap 802 of the plasma arc torch 800. In some embodiments, the retaining cap 802 is an integral part of a consumable cartridge 819 that also includes at least one of an electrode 814, nozzle 816 (including a nozzle body 850, nozzle orifice 852 and nozzle shield (not shown)), electrode cylinder 817, electrode sleeve 813, shield 818, a set of insulator components, and/or other consumables of the plasma arc torch 800. In other embodiments, the retaining cap 802 is a stand-alone torch component.

Figure 11A:
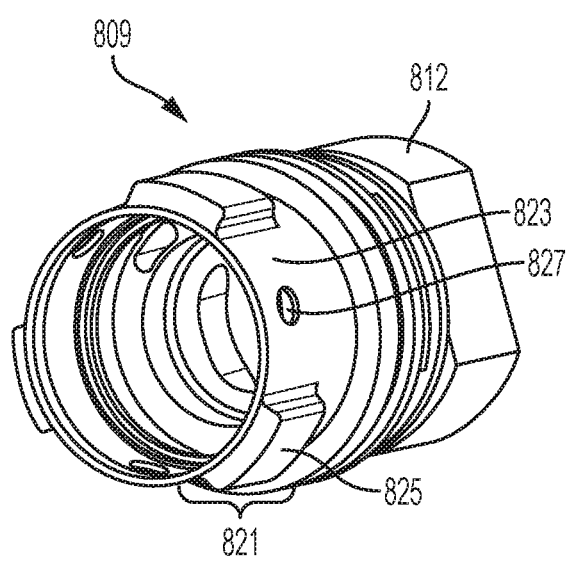
FIGS. 11A and B illustrate various views of another exemplary male connector component of the connector assembly of FIGS. 10A and B, where the male connector component is attached to a torch body.
Figure 11B:
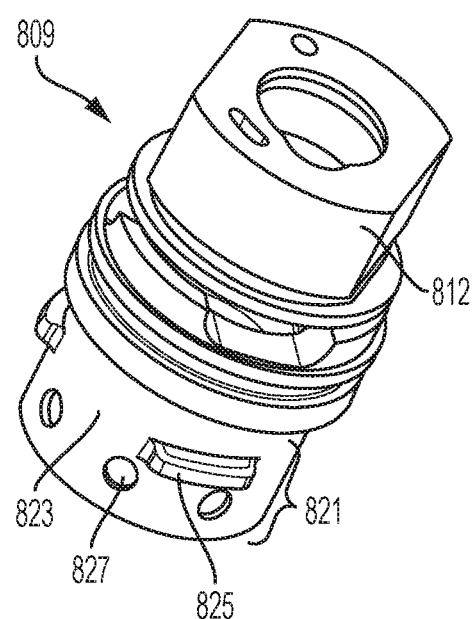

FIGS. 11A and B illustrate various views of another male connector component design 809 compatible with the connector assembly of FIGS. 10A and B, where the male connector component 809 is configured to couple to the torch body 812. The male connector component 809 can be integrally formed from the torch body 812 or comprise a separate structure attached to the torch body 812. As shown, the male connector component 809 has three thread regions 821 substantially evenly interspersed among three smooth regions 823 around the circumference of the proximal end 810 of the torch body 812. Each thread region 821 includes at least one thread 825 extending radially around the proximal end 810. The pitch of the thread 825 can be between 3.5 and 5.5 turns/inch (each turn being 360 degrees). In general, the pitch of the thread 825 can be adjusted so that the amount of required axial movement along the longitudinal direction 821 can be realized within the desired amount of rotation. The thread 825 of the male connector component 809 can be relatively thick to prevent over binding or cross threading. The three thread regions 821 provide three different start positions for attaching the male connector component 809 of the torch body 812 to the corresponding female connector component 806 of the retaining cap 802. The uniform placement of the thread regions 821 allows them to evenly assume the load placed by the female connector component 806 after engagement. In some embodiments, there are fewer or more than three thread regions 821 disposed on the male connector component 809. In some embodiments, there is more than one thread 825 in each thread region 802. In some embodiments, holes 827 of different sizes and/or shapes are dispersed radially around the smooth regions 823 and the thread regions 821 to allow varied gas flows through the male connector component 809, such as gas flows of different volumes, different distribution patterns, etc. In some embodiments, the male connector component 808 of FIGS. 10A and B can be substantially similar to the male connector component 809 of FIGS. 11A and B.

Figure 12A:
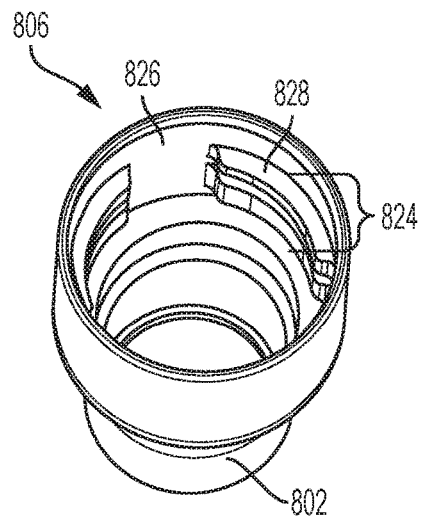
FIGS. 12A and B illustrate various views of an exemplary female connector component of the connector assembly of FIGS. 10A and B, where the female connector component is coupled to a retaining cap.
Figure 12B:
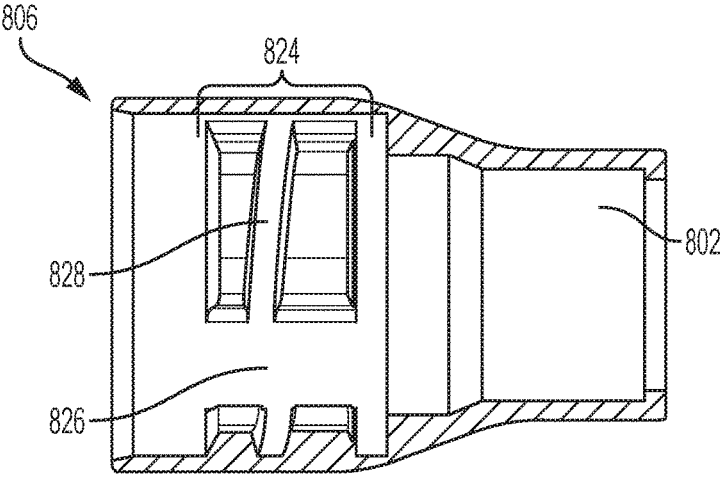

FIGS. 12A and B illustrate various views of an exemplary female connector component 806 of the connector assembly of FIGS. 10A and B, where the female connector component 806 is coupled to the retaining cap 802. The female connector component 806 can be integrally constructed from the retaining cap 802 or comprise a separate structure coupled to the retaining cap 802. In a complementary fashion in comparison to the male connector component 808, the female connector component 806 has three thread regions 824 interspersed among three smooth regions 826 around the circumference of the proximal end 804 of the retaining cap 802. Each thread region 824 includes at least one female thread 828 extending radially around the proximal end 804. The female thread 828 can have a similar pitch size as the male thread 822. In some embodiments, there are fewer or more than three thread regions 824 disposed on the female connector component 806. In some embodiments, there is more than one female thread 828 in each thread region 824.

Figure 13:
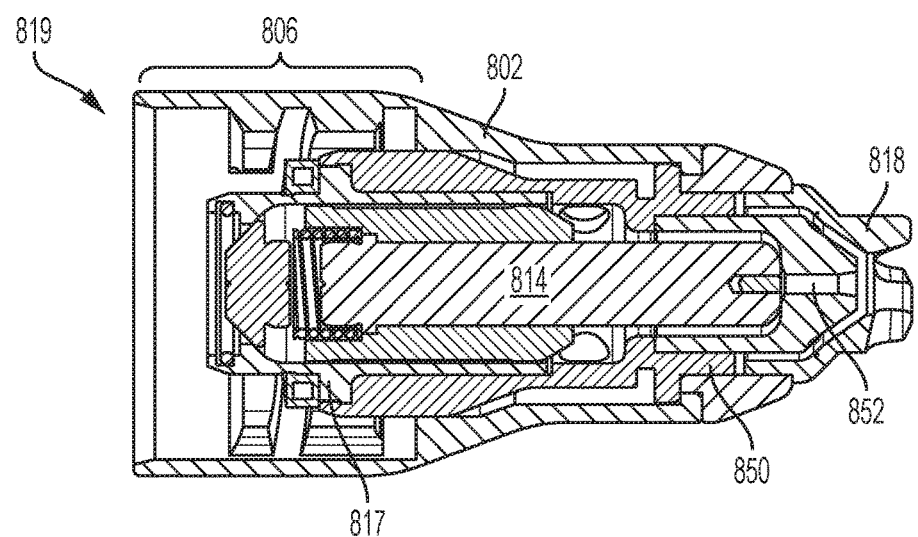
FIG. 13 illustrates an exemplary female connector component of the connector assembly of FIGS. 10A and B, where the female connector component is coupled to a consumable cartridge.

FIG. 13 illustrates an exemplary female connector component 806 of the connector assembly of FIGS. 10A and B, where the female connector component 806 is coupled to the consumable cartridge 819 via the retaining cap 802 of the cartridge 819. Because the cartridge 819 includes a suite of two or more consumable components chosen from a group including the retaining cap 802, electrode 814, nozzle 816 (including a nozzle body 850, nozzle orifice 852 and nozzle shield (not shown)), electrode cylinder 817, electrode sleeve 813, shield 818, a set of insulator components, and other consumable components, the cartridge 819 provides ease of use and shortens the time for assembling the plasma arc torch 800 in comparison to installing each consumable component individually. In addition, the use of the cartridge 819 in the torch 800 improves component alignment and cut consistency.

With reference to FIGS. 10A and B, to engage the male connector component 808 to the female connector component 806, the male connector component 808 is first inserted along a longitudinal direction 821 into the female connector component 806 while being maintained in a radially aligned orientation (i.e., the thread regions 820 of the male connector component 808 are aligned with the smooth regions 826 of the female connector component 806 and vice versa). The advancement of the male connector component 808 within the female connector component 806 in the radially aligned position can continue until an internal shoulder 830 of the torch body 812 comes into contact with at least one internal o-ring 832 of the electrode cylinder 817 or the nozzle body 850, where the o-ring 832 is situated proximal to a contact surface 834 of the electrode cylinder 817 or the nozzle body 850. During engagement, when the shoulder 830 of the torch body 812 touches the o-ring 832, a contact position is reached and the o-ring 832 begins to seal the shoulder 830 to the contact surface 834.

In some embodiments, when the contact position is reached, there is a gap of about 0.036 inches between the shoulder 830 and the contact surface 834 due the presence of the o-ring 832 between the two surfaces. In addition, no rotation of the male connector component 808 within the female connector component 806 can occur during the axial advancement prior to reaching the contact position due to misalignment of the threads on the two components. Rotation is only permitted after the contact position is reached (i.e., when the shoulder 832 of the torch body 812 encounters the o-ring 832), at which point the thread 822 on the male connector component 808 is properly positioned relative to the thread 828 on the female connector component 806 to permit rotational engagement. The amount of rotation is dependent on the pitch of the threads on the male and female connector components and the axial distance needed to securely engage the components.

Figure 14A:
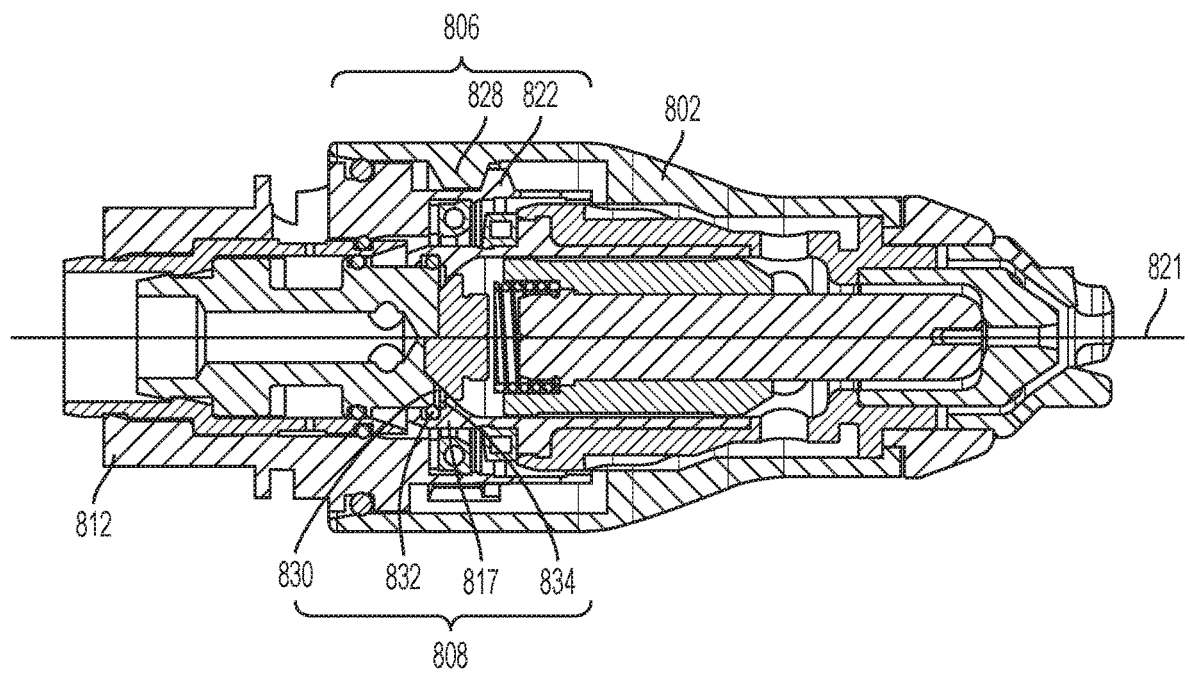
FIGS. 14A and B illustrate various views of the connector assembly of FIGS. 10A and B in the locked position, according to some embodiments of the present invention.
Figure 14B:
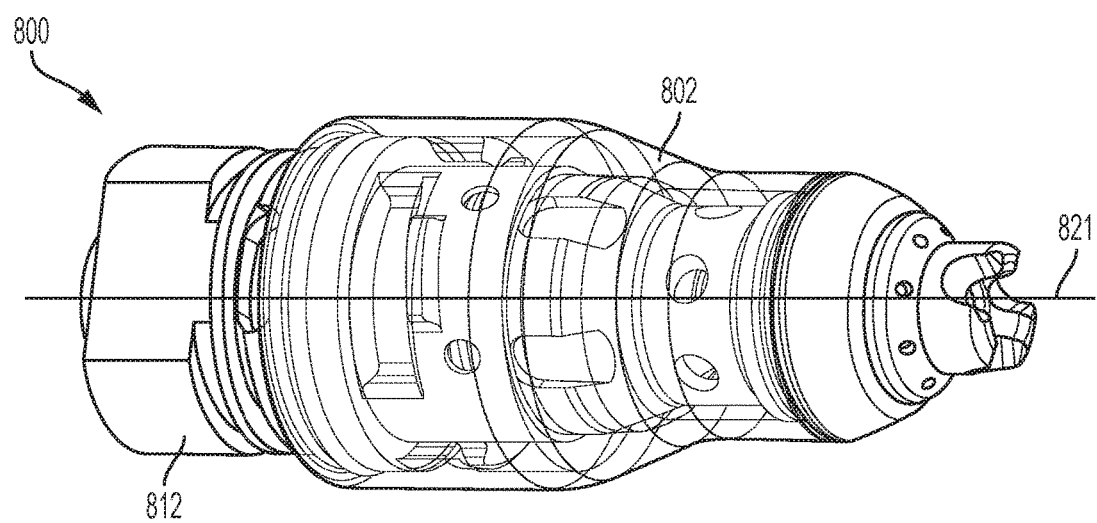

Once the contact position is reached, one connector component is rotatable in relation to the other connector component in a direction (i.e., clock-wise or counter-clockwise) by a number of degrees less than 360° before the components are secured to each other to reach the locked position. In addition, the rotational movement can involve further axial advancement of the male connector component 808 within the female connector component 806 to minimize the gap between the shoulder 830 and the contact surface 834. FIGS. 14A and B illustrate various views of the connector assembly of FIGS. 10A and B in the locked position, according to some embodiments of the present invention. As shown, the locked position is reached when the shoulder 830 of the torch body 812 rotates past the o-ring 832 and encounters the contact surface 834 of the electrode cylinder 817 or the nozzle body 850. In the locked position, the male thread 822 of each thread region 820 of the male connector component 808 locks into place with the corresponding female thread 828 of a thread region 824 of the female connector component 806. If there are three thread regions on each connector component, a rotation of about 60° is needed to achieve the locked position.

Figure 15:
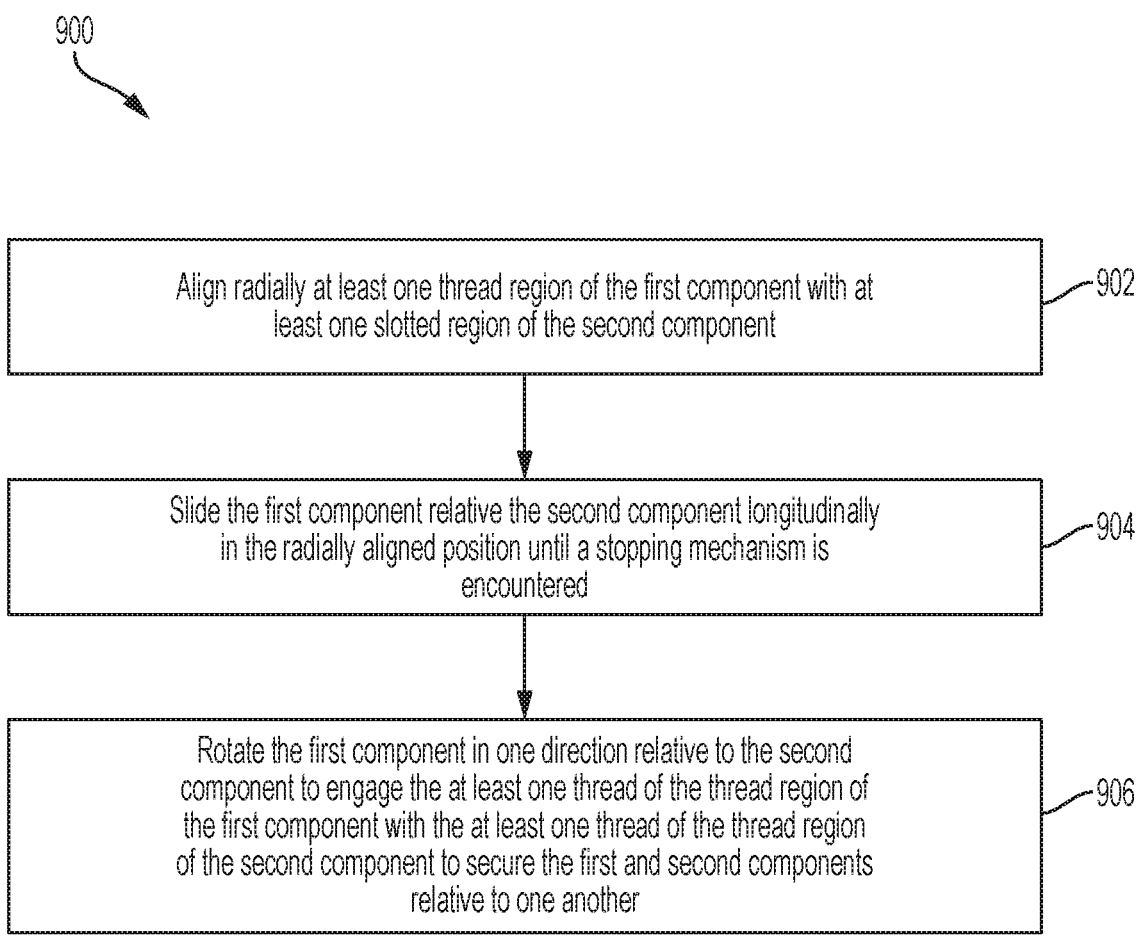
FIG. 15 illustrates a method for securing one connector component to another connector component, according to some embodiments of the present invention.

FIG. 15 illustrates a general method 900 for securing one connector component (a "first component") to another connector component (a "second component"), such as the male connector component 102 to the female connector component 120 of FIG. 1, the male connector component 350 to the female connector component 356 of FIGS. 4A and B, the male connector component 600 of FIG. 6 to a complementary female component (not shown), the male connector component 702 to the female connector component 720 of FIG. 7 or the male component 808 to the female component 806 of FIGS. 10A and B. In some embodiments, the first connector component is a male connector component, in which case the second connector component is a female connector component. In some embodiments, the first connector component is a female connector component, in which case the second connector component is a male connector component. The first and second components each has i) at least one thread region with at least one thread and ii) at least one slotted (i.e., smooth) region characterized by the absence of threads or other irregular features.

At step 902, each of the thread regions 112 of the first connector component is radially aligned with a smooth region of the second connector component. Conversely, each of the slotted regions of the first connector component can be radially aligned with a thread region of the second connector component. In some embodiments, the thread regions of both connector components are about identical. That is, the location and orientation of the thread(s) on one thread region are substantially the same as that of a different thread region associated with the same or different components. In addition, the thread regions and slotted regions can be rotationally symmetrical about each of the components.

At step 904, the first connector component is inserted along the longitudinal direction relative to the second connector component while being maintained in the radially aligned orientation. The insertion can be accomplished by sliding the first connector component relative to the second connector component without any rotation to axially abut the two components. In some embodiments, the sliding stops when a stopping mechanism associated with the male connector component (e.g., the flange 118 or the shoulder 830) encounters the stopping mechanism associated with the female connector component (e.g., encounters the stop rim 136 to reach the inserted position or encounters the o-ring 832 to reach the contact position). In some embodiments, the two components are prevented from rotating relative to each other until the inserted or contact position is reached, at which point the threads of the two components are aligned to permit rotation and engagement to reach the locked position. To disengage the components, the first connector component can be rotated relative to the second connector component in an opposite direction by about the same number of degrees as the rotation used during the engagement process, but no further. This is because an edge of a thread region of the first component would encounter an opposing face of a thread region of the second component in the rotational path to prevent over-rotation and accidental engagement in the opposite direction. In some embodiments (e.g., the designs of FIGS. 1-9B), when moving from the inserted position to the locked position during engagement or moving from the locked position to the inserted position during disengagement, the rotation of one component relative to the other component does not allow any axial movement. In other embodiments (e.g., the designs of FIGS. 10A-14B), when moving from the contact position to the locked position during engagement or moving from the locked position to the contact position during disengagement, the rotation of one component relative to the other component is accompanied by some axial movement of one component relative to the other component.

In general, the present invention allows a torch part with a connector component coupled thereto to be positioned in, or close to, its final axial position without rotating either the connector component or the corresponding component. Once the stopping mechanisms of the connector components make contact, each of the torch parts can be rotated to a number of degrees less than 360° to securely engage the parts with a sufficient joint strength and/or current-carrying capacity same as a traditional joint (e.g., a full-threaded joint).

Figure 9B:
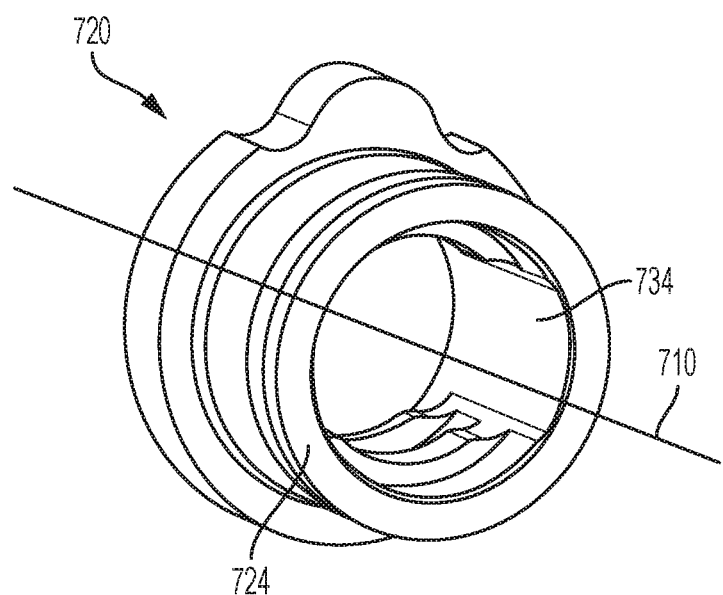

FIGS. 17-28 illustrate various male connector components that are configured for engagement with the female connector component 720 of FIGS. 7 and 9A and 9B to form a connector assembly. Each of these male connector components can be coupled to or an integral part of a consumable of a material processing torch, such as a plasma arc torch, a waterjet cutting head or a laser cutting head. Exemplary consumables to which a male connector component can be associated with in a plasma arc torch include an electrode, nozzle, retaining cap, shield and consumable cartridge.

Figure 17:
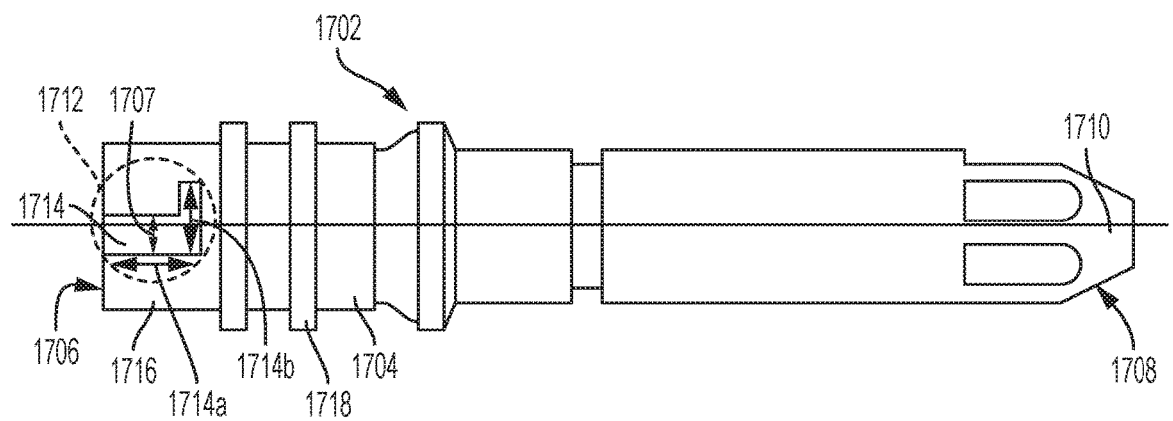
FIG. 17 shows an exemplary male connector component configured to engage the female connector component of FIGS. 7 and 9A and 9B.

FIG. 17 shows an exemplary male connector component 1702 configured to engage the female connector component 720 of FIGS. 7 and 9A and 9B. As shown, the male connector component 1702 has a body 1704 defining a proximal end 1706 (i.e., the end for engagement with the female connector component 720) and a distal end 1708 (i.e., the end opposite of the proximal end 1706) along a longitudinal axis 1710 extending through the body 1704. At least one engagement region 1712 is disposed about a radial portion of the longitudinal axis 1710 on an external surface of the body 1704 of the male connector component 1702 near its proximal end 1706. In some embodiments, at least two engagement regions 1712 (e.g., exactly two engagement regions) are disposed radially about the longitudinal axis 1710. Each engagement region 1712 includes at least one engagement feature 1714 disposed on the external surface of the body 1704. The male connector component 1702 also includes at least one free region 1716 on the external surface of its body 1704 that is characterized by an absence of the engagement features 1714. Each free region 1716 is disposed radially about the longitudinal axis 1710 adjacent to at least one engagement region 1712 on the external surface of the body 1704. In some embodiments, at least two free regions 1716 (e.g., exactly two free regions) are disposed radially about the longitudinal axis 1710, where each free region 1716 is radially located between a pair of the engagement regions 1712. Generally, the male connector component 1702 can have one or more free regions 1716 and one or more engagement regions 1712 interspersed radially about the longitudinal axis 1710.

In some embodiments, the male connector component 1702 also includes an axial stop 1718, in the form of a flange, for example, disposed circumferentially about the external surface of the connector body 1704 between the distal end 1708 and the engagement region(s) 1712. The axial stop 1718 is configured to contact a portion of the female connector component 720 during engagement of the two components. For example, the axial stop 1718 can axially align the female connector component 720 with the male connector component 1702 prior to rotational engagement of the respective engagement features.

As shown in the embodiment of FIG. 17, the engagement feature 1714 of the male connector component 1702 comprises an L-shaped channel etched into the body 1704 of the male connector component 1702 at the proximal end 1706. The L-shaped channel 1714 comprises a longitudinal channel portion 1714a located proximal to a radial channel portion 1714b. A radial width 1707 of the longitudinal channel portion 1714a can be about the same as the radial width of the thread 732 of the female connector component 720. Thus, when coupling the male connector component 1702 to the female connector component 720, the thread 732 of the female connector component 720 is adapted to be inserted into the opening of the longitudinal channel portion 1714a of the male connector component 1702. The thread 732 can then axially advance within the longitudinal channel portion 1714a until the stopping rim 736 of the female connector component 720 interacts with the axial stop 1718 of the male connector component 1702 to prevent further axial advancement of the male connector component 1702 within the female connector component 720 in the longitudinal direction 1710, at which point a longitudinal stopping position, hereinafter referred to as the "inserted position," is reached.

At the inserted position, the thread 732 of the female connector component 720 is at the bottom of the longitudinal channel portion 1714a, and the thread 732 can then be rotated radially within the radial channel portion 1714b to fully engage the male and the female connector components 1702 and 720 to reach the "locked position." Due to the short length of the radial channel portion 1714b, the rotation required to securely fasten the male and female components 1702 and 720 to each other to achieve the locked position is less than 360°. In the locked position, each engagement region 1712 of the male connector component 1702 faces a thread region 732 of the female connector component 720 and each free region 1716 of the male connector component 1702 faces a smooth region 734 of the female connector component 720. Thus, no rotation of the two connector components 1702 and 720 relative to one another is permitted during the axial advancement of the female thread 732 within the longitudinal channel portion 1714a of the male engagement feature 1714 prior to reaching the inserted position. The two components can only rotate relative to each other at the inserted position when the female connector component 720 reaches the radial channel portion 1714b of the male engagement feature 1714. Further, the rotational movement between the connector components 1702 and 720 to reach the locked position does not involve any further axial advancement in the longitudinal direction 1710.

Similarly, to disengage the two connector components 1702 and 720 (i.e., moving from the locked position to the inserted position), an operator can rotate one component in relation to the other component in a direction opposite of the direction of engagement by about the same number of degrees to reach the inserted position. At the inserted position, the female thread 732 is aligned with the longitudinal channel portion 1714a and can thus be slidably removed from the longitudinal channel portion 1714a along the longitudinal axis 1710. No rotation is permitted when the male connector component 1702 slides out of the female connector component 720.

In some embodiments, the engagement feature(s) 1714 of one engagement region 1712 is discontinuous (i.e., does not form a continuous rotational path) from the engagement feature(s) 1714 of an adjacent engagement region 1712 of the male connector component 1702. That is, a corresponding thread 732 of the female connector component 720 cannot rotate and further engage with the engagement feature(s) 1714 of a second engagement region 1712 of the male connector component 1702 once the thread 732 is in a locked position with the engagement feature(s) 1714 of a first engagement region 1712.

In some embodiments, the degree of rotation required for maximum engagement and/or disengagement of the female connector component 720 and the male connector component 1702 is dependent on the number of engagement regions and free regions disposed on the body of each component. This degree of rotation is generally less than 360 degrees. For example, if there is one engagement region and one free region on the male connector component 1702, the engagement feature(s) of the engagement region can be engaged and/or disengaged with one rotation of about 180° or less, such as 90°. If there are two engagement regions on the male connector component 1702, the engagement feature(s) of the engagement regions can be engaged and/or disengaged with one rotation of about 90° or less.

Figure 18:
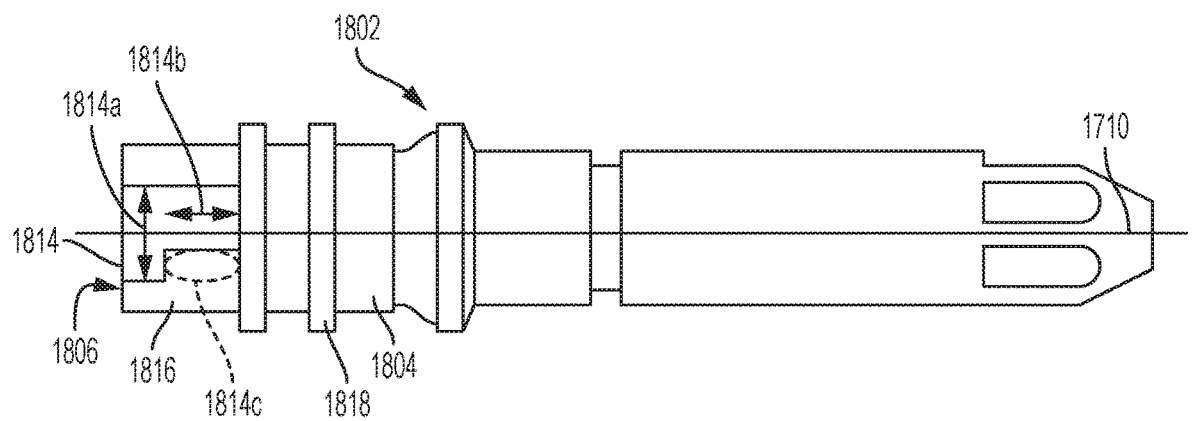
FIG. 18 shows another exemplary male connector component configured to engage the female connector component of FIGS. 7 and 9A and 9B.

FIG. 18 shows another exemplary male connector component 1802 configured to engage the female connector component of FIGS. 7 and 9A and 9B. The male connector component 1802 is substantially the same as the male connector component 1702 of FIG. 17 except for the engagement feature 1814. As shown, the engagement feature 1814 of the male connector component 1802 comprises an L-shaped bump that is raised from the body 1804 of the male connector component 1802 at the proximal end 1806 of the male connector component 1802. The L-shaped bump 1814 comprises a radial bump portion 1814*a* located proximal to a longitudinal bump portion 1814*b* and a nook area 1814*c* formed by the intersection of the radial bump portion 1814*a* and the longitudinal bump portion 1814*b*.

When coupling the male connector component 1802 to the female connector component 720, at least one of a set of free regions 1816 of the male connector component 1802 is configured to align with at least one of the thread regions 730 of the female connector component 720 and vice versa to facilitate slidable axial displacement of one component into the other component. The thread regions 730 of the female connector component 720 can axially advance along the free regions 1816 of the male connector component 1802 until the stopping rim 736 of the female connector component 720 interacts with the axial stop 1818 of the male connector component 1702 to prevent further axial advancement of the male connector component 1702 within the female connector component 720 in the longitudinal direction 1810, at which point the "inserted position" is reached. During the axial advancement, the female thread 732 is prevented from rotation due to the radial bump portion 1814*a* of the male engagement feature 1814 guiding the axial advancement. At the inserted position, the thread 732 on the thread region 730 of the female connector component 720 is axially aligned with the longitudinal bump portion 1814*b* of the male engagement feature 1814 and can thus be rotated radially into the nook area 1814*c* of the male engagement feature 1814 to fully engage the male and the female connector components 1802, 720 to achieve the locked position.

Figure 19A:
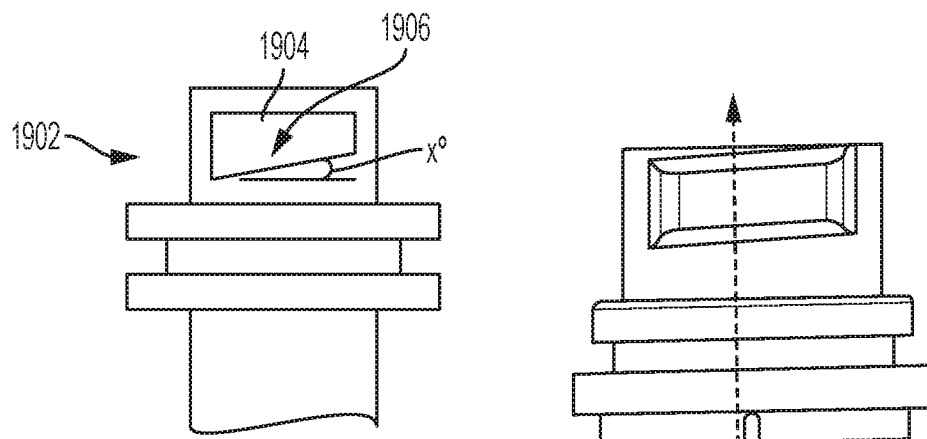
FIGS. 19a-c show additional exemplary male connector components configured to engage the female connector component of FIGS. 7 and 9A and 9B.
Figure 19B:
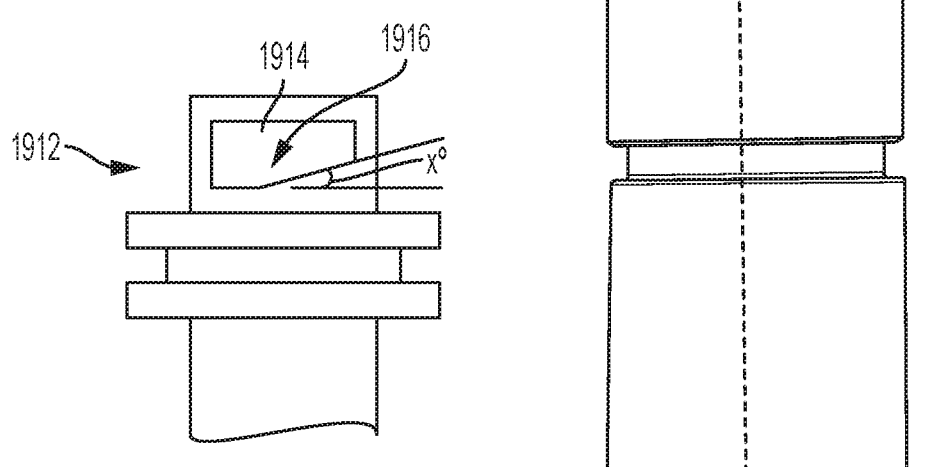
Figure 19C:
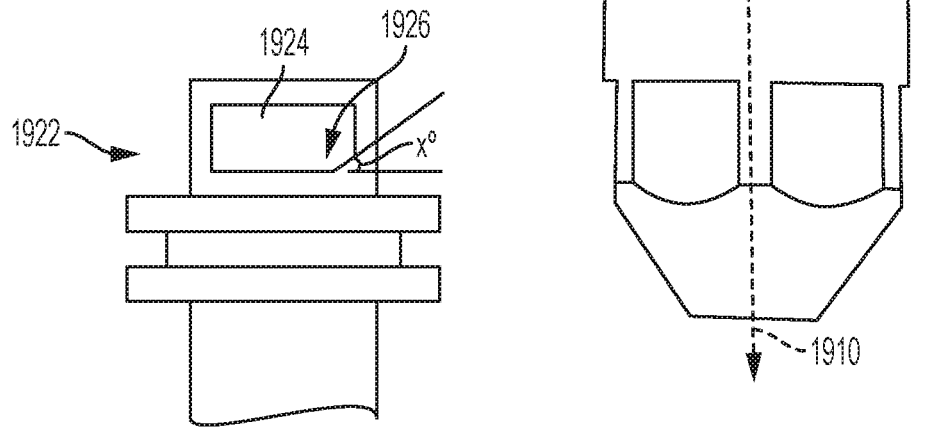

FIGS. 19*a-c* show additional exemplary male connector components 1902, 1912 and 1922 configured to engage the female connector component 720 of FIGS. 7 and 9A and 9B. In general, each male engagement feature of the male connector component 1902, 1912 or 1922 can comprise at least one thread. Threads of different male connector components can have different pitches and/or tangent points to achieve different contact with the corresponding female connector component 720 when engaged. Generally, the angle of a thread on the male connector component 1902, 1912 or 1922 can decrease as a complementary female component is rotated about the longitudinal axis 1910 to engage with the male connector component. Thus, the thread angle varies as the thread extends about the male connector component. A tangent point defines this thread angle.

In FIG. 19*a*, the male connector component 1902 includes a thread 1904 as an engagement feature for engaging a thread 732 of the female connector component 720. When fully engaged in the locked position, a female thread 732 is adapted to contact the male thread 1904 at the tangent point 1906. The female thread 732 is prevented from further rotating (i.e., to the left as shown in FIG. 19*a*) beyond the tangent point 1906 when it makes physical contact with the tangent point 1906. In FIG. 19*b*, the male connector component 1912 includes a thread 1914 with a tangent point 1916 that is at a different radial location on the thread 1914 than the tangent point 1906 of the male connector component 1902. Thus, when fully engaged in the locked position, the female thread 732 contacts the thread 1914 at a different location in comparison the thread 1904 of the male connector component 1902. Further, the threads 1904 and 1914 can have different thread pitches. For example, the thread 1904 of the male connector component 1902 can have a consistent/steady pitch while the thread 1914 of the male connector component 1912 can have a varying pitch which starts aggressive at the right most side of the thread 1914 and then curves to a much decreased (e.g., almost flat) angle as the thread extends to the left in FIG. 19*b*. In FIG. 19*c*, the male connector component 1922 includes a thread 1924 with a tangent point 1926 that is at a different radial location in comparison to the tangent points 1906 and 1916 of the male connector component 1902 and 1912, respectively. Thus, when fully engaged in the locked position, the female thread 732 contacts the thread 1924 at a different location than the threads 1904 and 1914 of the male connector components 1902 and 1912, respectively.

Figure 20:
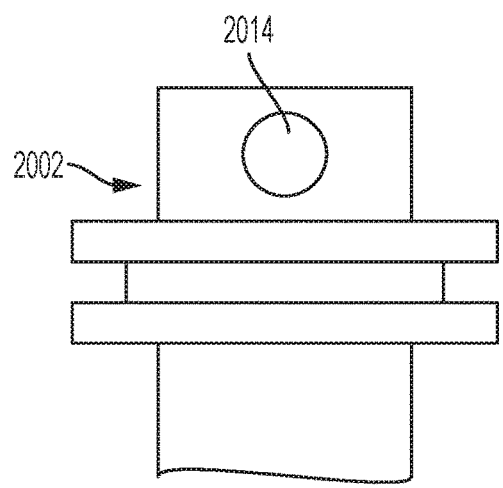
FIGS. 20-23 show additional exemplary male connector components each with different engagement features configured to engage the female connector component of FIGS. 7 and 9A and 9B.
Figure 21:
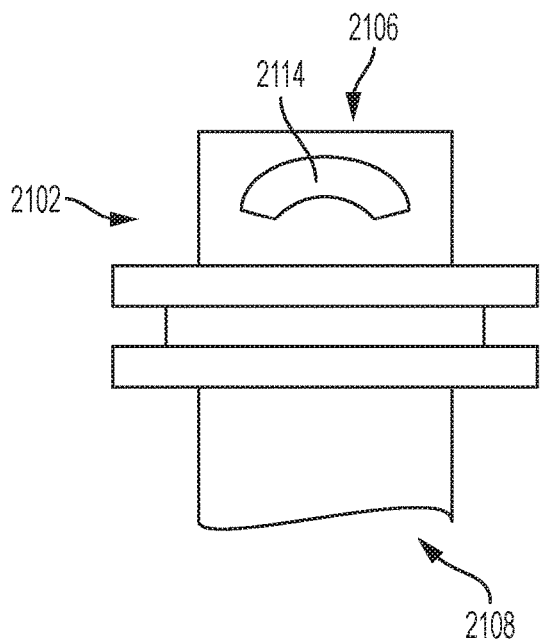

FIGS. 20-23 show additional exemplary male connector components 2002, 2102, 2202 and 2302 each with different engagement features configured to engage the female connector component 720 of FIGS. 7 and 9A and 9B. As shown in FIG. 20, the engagement feature 2014 in an engagement region of the male connector component 2002 is a nub that is adapted to physically contact the thread 732 of the female connector component 720 when the two components 2002 and 720 are engaged in the locked position. The contact between the male nub 2014 and the female thread 732 prevents the male and female contact components 2002 and 720 from further rotating relative to each other and axially restrains the male contact component 2002 relative to the female connector component 720. FIG. 21 shows another engagement feature 2114 of the male connector component 2102, which is a curved, non-linear thread that is adapted to physically contact the thread 732 of the female connector component 720 when the two components 2102 and 720 are engaged in the locked position. The curved thread 2114 does not follow a conventional thread path with a fixed angle, but rather has a thread path with a variable sloped pitch. In operation, during rotational engagement with the female connector component 720, the level of interference/contact provided by the curved thread 2114 of the male connector component 2102 with the female connector component 720 increases and/or is more gradual as compared to traditional thread shapes. Specifically, FIG. 21 shows that the curved thread 2114 has a convex curvature in a direction toward the proximal end 2106 of the male connector component 2102. In alternative embodiments, the curved thread 2114 has a convex curvature in a direction toward the distal end 2108 of the male connector component 2102.

Figure 22:
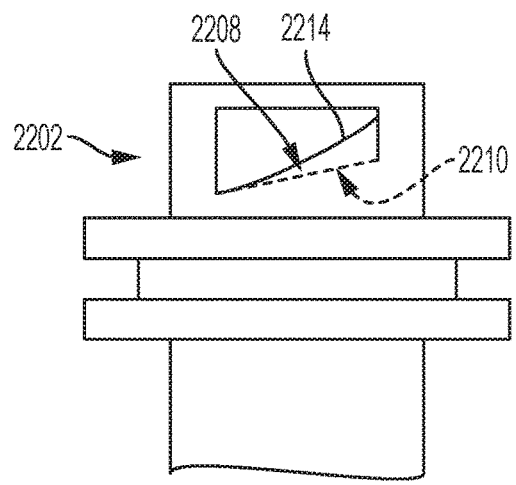
Figure 23:
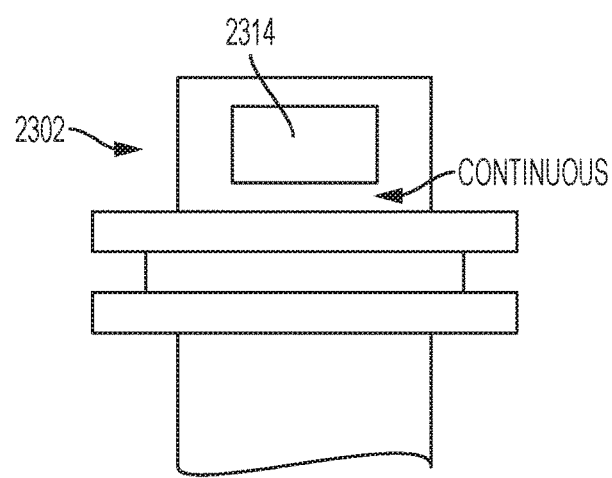
Figure 30:
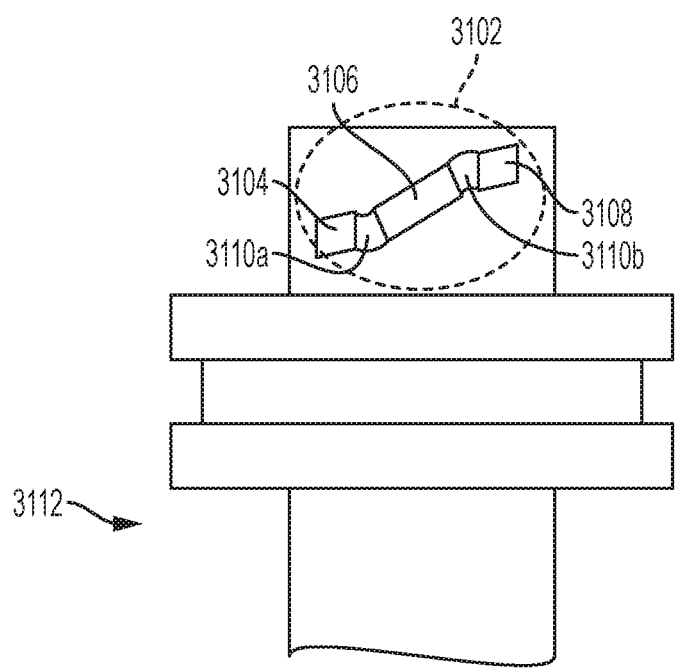
FIG. 30 shows yet another exemplary male connector component configured to engage the female connector component of FIGS. 7 and 9A and 9B.

FIG. 22 shows another engagement feature 2214 of the male connector component 2202, which is a wedge that is adapted to physically contact the thread 732 of the female connector component 720 when the two components 2102 and 720 are engaged in the locked position. The wedge 2214 is not a thread as it defines a curved, non-helical path 2208, which is compared to a traditional, consistent/linear thread path shown by the dotted line 2210. FIG. 23 shows yet another engagement feature 2314 of the male connector component 2302. As shown, the engagement feature 2314 comprises a thread with a thread angle so shallow that it is capable of forming a continuous rotational thread path with the engagement feature of an adjacent engagement region (not shown) on the male connector component 2302. FIG. 30 further exemplifies this concept. For example, in FIG. 30, the engagement region 3102 of the male connector component 3112 has multiple distinct sections, including a lead in section 3104, a thread connection section 3106, and a run out section 3108. Between a pair of these sections within the engagement region 3102, an optional transition region 3110 may be provided. Each transition region 3110 can have a varied thread angle providing a transition/path between the sections to which it is connected. For example, the transition region 3110a provides a transition/path between the lead in section 3104 and the thread connection section 3106, and the transition region 3110b provides a transition/path between the thread connections section 3106 and the run out section 3108. In some embodiments, the transition region(s) 3110 have a reduced radial height from the surface of the male connector component 3112 (e.g., being shorter/remaining closer to the surface of the male connector component 3112) when compared to any one of the lead in section 3104, thread connection section 3106, and run out section 3108. In some embodiments, the lead in section 3104 has a thread angle that is continuous with the run out section 3108 of an adjacent engagement region (not shown), thus adjacent engagement regions establish a continuous rotational path for engaging the female connector component 720.

Figure 24:
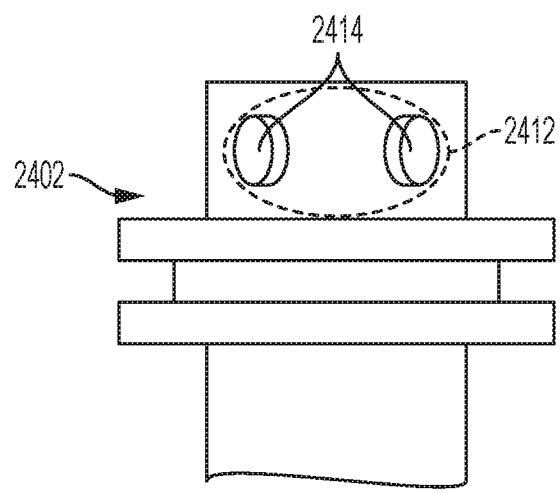
FIG. 24 shows an exemplary male connector component having multiple engagement features in an engagement region configured to engage the female connector component of FIGS. 7 and 9A and 9B.

In some embodiments, each engagement region of a male connector component includes multiple distinct engagement features with a gap between a pair of the engagement features. The multiple engagement features of each engagement region can create a continuous rotational path within the engagement region, but they do not form a continuous rotational path with the engagement features of an adjacent engagement region. Alternatively, the multiple engagement features of each engagement region create a discontinuous rotation path within the engagement region, but the border engagement features of each engagement region can form a continuous rotational path with an adjacent engagement region. FIG. 24 shows an exemplary male connector component 2402 having multiple engagement features 2414 in an engagement region 2412 configured to engage the female connector component 720 of FIGS. 7 and 9A and 9B. As shown, the engagement features 2414 include a set of two nubs/bosses disposed circumferentially about the male connector component 2402, where at least one of the nubs/bosses is adapted to physically contact the thread 732 of the female connector component 720 when the two components 2402 and 720 are engaged in the locked position. In some embodiments, the set of nubs/bosses 2414 are axially offset relative to one another such that they form a slightly pitched arrangement that can physically interact with the female thread 732 to achieve secure engagement.

Figure 25:
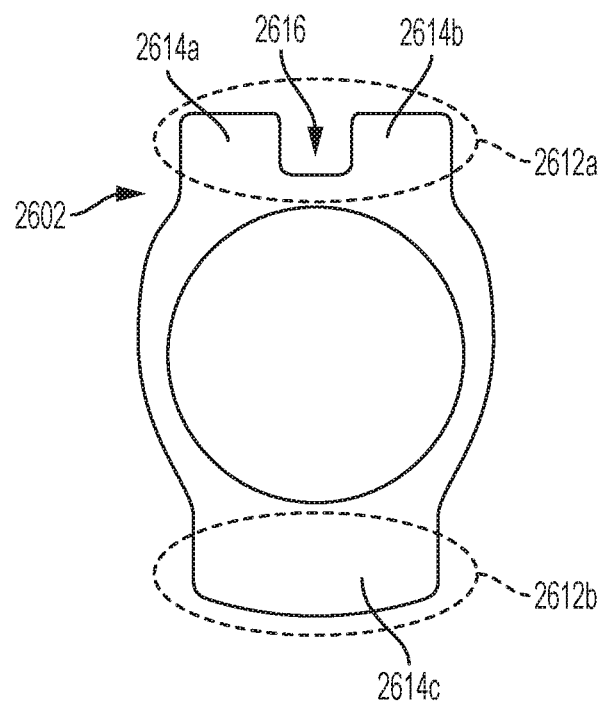
FIG. 25 shows yet another exemplary male connector component configured to engage the female connector component of FIGS. 7 and 9A and 9B.

In some embodiments, instead of nubs/bosses, the multiple of engagement features of an engagement region include a plurality of threads disposed circumferential about the male connector component. FIG. 25 shows yet another exemplary male connector component 2602 configured to engage the female connector component 720 of FIGS. 7 and 9A and 9B. As shown, the male connector component 2602 has two engagement regions 2612a and 2612b that are substantially opposite of each other around a circumference of the male connector component 2602. One engagement region 2612a has two engagement features comprising two distinct thread sections 2614a and 2614b separated by a gap 2616. The other engagement region 2612b has one engagement feature comprising one thread section 2614c. The three thread sections 2614a-c can be disposed at a substantially similar longitudinal position on the male connector component 2602 and extend substantially radially outwards. In some embodiments, the three thread sections 2614a-c have different pitches. In some embodiments, the thread sections 2614a and 2614b of the engagement region 2612a are in a pitched arrangement relative to each other such that they form a continuous rotational path within the engagement region 2412. However, each of the thread sections 2614a and 2614b of the engagement region 2612a are adapted to form a discontinuous rotational path with the thread section 2614c.

In some embodiments, each of the thread sections 2614a-c extends less than 120 degrees circumferentially about the male connector component 2602, such as about 70 degrees circumferentially about the male connector component 2602. In some embodiments, the thread sections 2614a and 2614b of the engagement region 2612a extend to a smaller degree than the thread section 2614c of the engagement region 2612b. As shown, the thread sections 2614a-c are non-symmetrically arranged about the male connector component 2602, with the thread sections 2614a and 2614b of the engagement region 2612a located closer to one another than to the thread section 2614c of the engagement region 2612b. However, the engagement regions 2612a and 2612b are generally symmetrical and opposite of each other.

FIG. 26 shows yet another exemplary male connector component 2502 configured to engage the female connector component 720 of FIGS. 7 and 9A and 9B. As shown, the male connector component 2502 includes two engagement regions 2512 circumferentially interspersed between two free regions 2516. Each engagement region 2512 includes an engagement feature 2514 comprising a thread. Unlike the male connector component 702 of FIGS. 7, 8A and 8B, which has two smooth regions 716 that are relatively smooth and free of any structure, each of the two free regions 2516 of the male connector component 2502 includes a projecting feature 2520, such as a lip or a ridge. In other embodiments, the projecting feature in each free region 2512 is a knurled structure, has surface textures, or has another type of projection that extends radially outward to a lesser degree than that of the threads 2514 in the engagement regions 2512. The projecting feature 2520 of each free region 2516 can be adapted to maintain physical continuity between the adjacent threads 2514 of the engagement regions 2512. However, each projecting feature 2520 does not establish a continuous rotational path between the adjacent threads 2514. Thus, during engagement, the free regions 2516 of the male connector component 2502 can still align with the thread regions 730 of the female connector component 720

(and the smooth regions 734 of the female connector component 720 align with the engagement regions 2512 of the male connector component 2502) before axially advancing the two components 2502, 720 into each other to reach the inserted position prior to rotational engagement. That is, the lower clearance of the projecting features 2520 in the free regions 2516 of the male connector component 2502 do not prevent the relative axial advancement of the thread regions 732 of the female connector component 720 to reach the inserted position.

The engagement regions that are circumferentially disposed about a male connector component can be symmetrical or non-symmetrical. FIG. 27 shows the cross-sectional view of yet another exemplary male connector component 2702 configured to engage the female connector component 720 of FIGS. 7 and 9A and 9B. The male connector component 2702 includes two engagement regions 2712a and 2712b. Each engagement region includes one engagement feature comprising a thread section 2714a or 2714b. Each thread section 2714a or 2714b has a shorter radial extent than that of the thread 714 of the male connector component 702 of FIGS. 8A-C such that they only occupy one quadrant of the cross-sectional plane formed transversal axes A and B. That is, neither thread section 2714a nor 2714b crosses the transversal axis A or B. In some embodiments, a thread portion of one engagement region of the male connector component 2702 functions to being the threading process with the female connector component 720 and the thread portion of the other engagement region performs a substantial amount of the final engagement. Thus, the thread portions 2714a and 2714b are offset in a manner that results in the sequential engagement of the two engagement regions, not simultaneously. For example, the thread portions of the male connector component 2702 are offset such that when rotationally engaging with the female connector component 720, the engagement may begin with one thread section (e.g., the thread section 2714a), transition mid-rotation to include both thread sections 2714a and 2714b, before complete rotational engagement with the other thread section (e.g., the thread section 2714b). In some embodiments, the thread sections 2714a and 2714b form a discontinuous thread path. In alternative embodiments, the thread sections 2714a and 2714b form a continuous thread path. As shown, the thread sections 2714a and 2714b are radially symmetrical about a circumference of the male connector component 2702.

FIG. 28 shows the cross-sectional view of yet another exemplary male connector component 2802 configured to engage the female connector component 720 of FIGS. 7 and 9A and 9B. The male connector component 2802 includes two engagement regions 2812a and 2812b. Each engagement region includes one engagement feature comprising a thread section 2814a or 2814b. Each thread section 2814a or 2814b has a shorter radial extent than that of the thread 714 of the male connector component 702 of FIGS. 8A-C such that they only occupy one quadrant of the cross-sectional plane formed transversal axes A and B. In some embodiments, the thread sections 2814a and 2814b sequentially engages the female connector component 720 as described above with respect to FIG. 27. In some embodiments, the thread sections 2814a and 2814b form a discontinuous thread path. In some embodiments, the thread sections 2814a and 2814b form a continuous thread path. As shown, the thread sections 2814a and 2814b are radially non-symmetrical about a circumference of the male connector component 2702.

Figure 29:
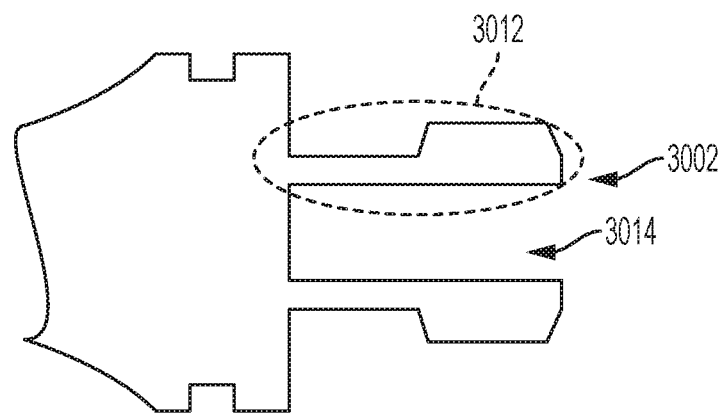
FIG. 29 shows yet another exemplary male connector component configured to engage the female connector component of FIGS. 7 and 9A and 9B.

FIG. 29 shows yet another exemplary male connector component 3002 configured to engage the female connector component 720 of FIGS. 7 and 9A and 9B. The male connector component 3002 includes at least one engagement region 3012 and at least one free region 3014. Each free region 3014 can be a void with relatively no material. Each engagement region 3012 includes a slot 3016 recessed into the body of the male connector component 3002 that is configured to engagement the complementary feature (e.g., thread 732) of the female connector component 720.

Figure 31:
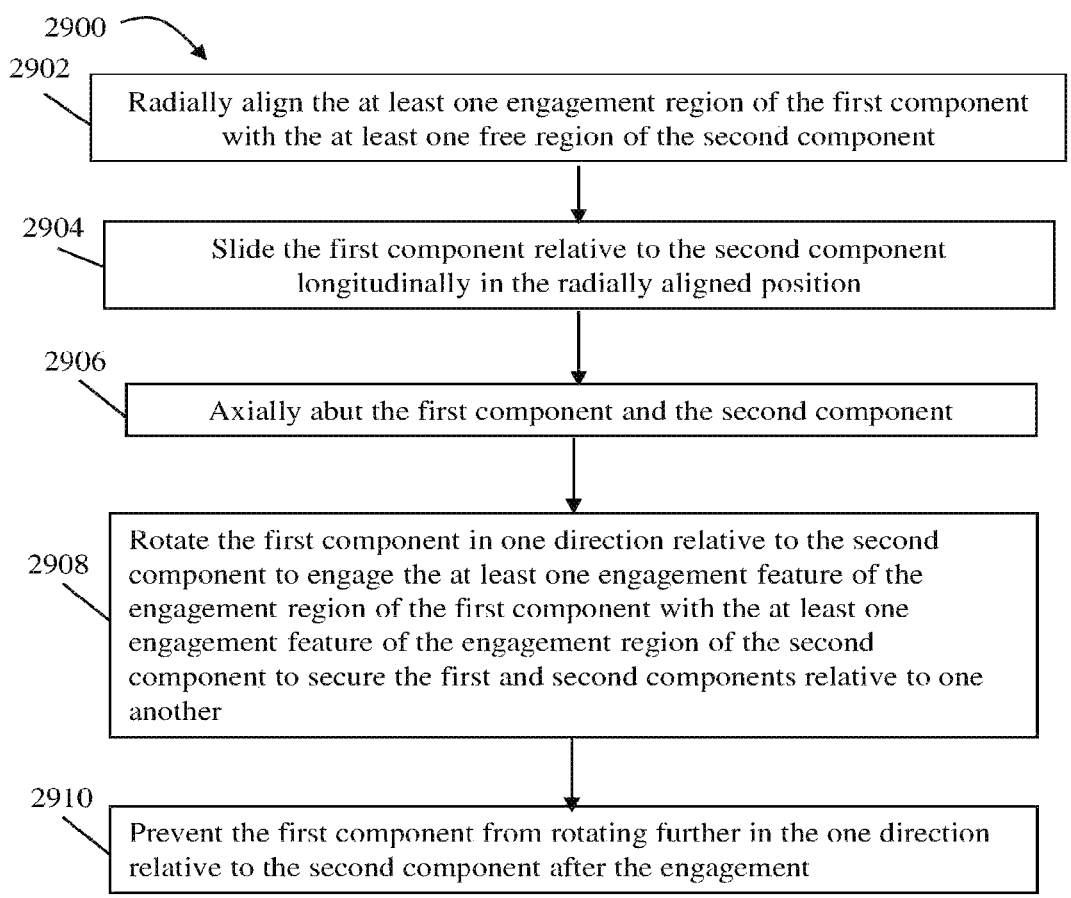
FIG. 31 illustrates a general method for securing a male connector component of FIGS. 18-30 to the female connector component of FIGS. 7, 9A and 9B.

FIG. 31 illustrates a general method 2900 for securing a male connector component of FIGS. 18-30 to the female connector component 720 of FIGS. 7, 9A and 9B. In some embodiments, one or more of the exemplary male connector components of FIGS. 18-30 have an axial stop feature (e.g., similar to the axial stop 1718) described above with reference to FIG. 17 to axially align the male and female connector components prior to enabling the rotational engagement.

As shown, at step 2902, each of the engagement regions of the male connector component is radially aligned with a smooth region of the female connector component 720. Conversely, each of the free regions of the male connector component can be radially aligned with a thread region 730 of the female connector component 720. At step 2904, the male connector component is inserted along the longitudinal direction relative to the female connector component 720 while being maintained in the radially aligned orientation. The insertion can be accomplished by sliding the male connector component relative to the female connector component 720 without any rotation.

At step 2906, the axial sliding stops when the two connector components axially abut each other. For example, the sliding stops when a stopping mechanism associated with the male connector component (e.g., the axial stop/flange 1718) encounters the stopping mechanism associated with the female connector component 720 (e.g., the stop rim 136) to reach the inserted position. In some embodiments, the two connector components are prevented from rotating relative to each other until the inserted position is reached, at which point the engagement features of the two components are aligned to permit rotation and engagement to reach the locked position. At step 2910, after engagement, the two components are prevented from rotating further in the engagement direction due to the physical contact/locking between the engagement features of the two connector components at the locked position.

In some embodiments, to disengage the components, the male connector component can be rotated relative to the female connector component 720 in an opposite direction by about the same number of degrees as the rotation used during the engagement process, but no further. This is because an edge of an engagement feature of the male component would encounter an opposing face of a thread/engagement region 730 of the female connector component 720 in the rotational path to prevent over-rotation and accidental engagement in the opposite direction. In some embodiments, when moving from the inserted position to the locked position during engagement or moving from the locked position to the inserted position during disengagement, the rotation of one component relative to the other component does not allow any axial movement.

It should also be understood that various aspects and embodiments of the invention can be combined in various ways. Based on the teachings of this specification, a person of ordinary skill in the art can readily determine how to combine these various embodiments.

What is claimed is:

1. A connector component configured for coupling a consumable component to a plasma arc torch, the connector component comprising:
   a body having a proximal end and a distal end disposed along and defining a longitudinal axis;
   at least two engagement regions disposed radially about the longitudinal axis on a surface of the body, wherein each engagement region includes at least one engagement feature disposed on the surface of the body; and
   at least two free regions disposed radially about the longitudinal axis on the surface of the body, each free region radially located between a pair of the engagement regions, each free region characterized by an absence of the engagement feature;
   wherein the at least one engagement feature in a first engagement region of the at least two engagement regions creates a discontinuous rotational path with the at least one engagement feature of an adjacent engagement region of the at least two engagement regions, the at least one engagement feature of the first region includes a structure extending from the body that engages with a corresponding engagement feature of a corresponding connector component of the plasma arc torch.

2. The connector component of claim 1, wherein the at least one engagement feature of each engagement region comprises a plurality of engagement features with a gap between a pair of the engagement features.

3. The connector component of claim 2, wherein the plurality of engagement features of each engagement region creates a continuous rotational path within the engagement region, but not with the engagement features of another engagement region.

4. The connector component of claim 2, wherein a first engagement feature of the plurality of engagement features of an engagement region forms the discontinuous rotational path with an adjacent engagement feature of the plurality of engagement features of the engagement region.

5. The connector component of claim 1, wherein the at least one engagement feature comprises a curved thread.

6. The connector component of claim 5 wherein the curved thread has a convex curvature in a direction toward the distal end.

7. The connector component of claim 5 wherein the curved thread has a convex curvature in a direction toward the proximal end.

8. The connector component of claim 1, wherein the at least one engagement feature comprises a nub.

9. The connector component of claim 1, wherein the at least one engagement feature comprises a slot.

10. The connector component of claim 2, wherein the plurality of engagement features of an engagement region comprises a plurality of threads having different pitches.

11. The connector component of claim 2, wherein the plurality of engagement features of an engagement region comprises two bosses.

12. The connector component of claim 1, wherein at least one of the free regions includes a feature that is physically continuous between the adjacent engagement features without establishing a continuous rotational path between the adjacent engagement features.

13. The connector component of claim 1, wherein the connector component comprises a male component configured to engage a female component.

14. The connector component of claim 13, further comprising an axial stop disposed radially about the surface of the body between the distal end and the engagement regions, the axial stop configured to contact the female component when the connector component advances inside of the female component.

15. The connector component of claim 14, wherein the male component is aligned with the female component via the axial stop prior to rotational engagement of the engagement features between the male and female components.

16. The connector component of claim 1, wherein at least one of the free regions of the connector component is configured to align with at least one of the engagement regions of the corresponding component to facilitate slidable displacement of one component relative to the other component along the longitudinal axis.

17. The connector component of claim 1, wherein one component is rotatable in relation to the other component in a first direction by a number of degrees less than 360 degrees, thereby permitting fixed engagement with the other component.

18. The connector component of claim 17, wherein the components are disengaged when one component is rotated in relation to the other component in a second direction opposite from the first direction by about the same number of degrees of rotation about the longitudinal axis.

19. The connector component of claim 1, wherein the consumable component comprises one of an electrode, a cartridge, a nozzle or a retaining cap.

20. The connector component of claim 1, wherein the connector component consists of two engagement regions.

21. The connector component of claim 1, wherein the at least two engagement regions are radially symmetrical about the longitudinal axis.

22. The connector component of claim 1, wherein the at least two engagement regions are radially asymmetrical about the longitudinal axis.

23. A connector component configured for coupling an electrode to a plasma arc torch, the connector component comprising:
   a body having a proximal end and a distal end disposed along and defining a longitudinal axis;
   at least two engagement regions disposed radially about the longitudinal axis on a surface of the body near the proximal end, wherein each engagement region includes at least one engagement means disposed on the surface of the body, the engagement means adapted to mate with a corresponding engagement means of a corresponding connector component of the plasma arc torch to secure the connector component by engaging with the corresponding connector component of the plasma arc torch; and
   at least two free regions disposed radially about the longitudinal axis on the surface of the body, each free region radially located between a pair of the engagement means,
   wherein the at least one engagement means in a first engagement region of the at least two engagement regions does not create a continuous rotational path with the at least one engagement means of an adjacent engagement region of the at least two engagement regions.

24. The connector component of claim 23, wherein the at least one engagement means comprises a curved thread.

25. The connector component of claim 23, wherein the at least one engagement means comprises a nub.

26. The connector component of claim 23, wherein the at least one engagement means comprises a slot.

27. The connector component of claim 23, wherein the at least one engagement means of each engagement region comprises a plurality of engagement means with a gap between a pair of the engagement means.

28. The connector component of claim 27, wherein the plurality of engagement means of an engagement region comprises a plurality of threads having different pitches.

29. The connector component of claim 27, wherein the plurality of engagement means of an engagement region comprises two bosses.

* * * * *